United States Patent
Saitoh et al.

(10) Patent No.: US 8,597,153 B2
(45) Date of Patent: Dec. 3, 2013

(54) AUTOMATIC TRANSMISSION

(75) Inventors: Noriaki Saitoh, Wako (JP); Soichi Sugino, Wako (JP); Toshikazu Kouno, Wako (JP); Kohei Iizuka, Wako (JP); Mariko Shibamura, Wako (JP); Shoji Machida, Wako (JP); Jorg Muller, Chemnitz (DE); Rico Resch, Wilsdruff (DE); Mirko Leesch, Thum (DE)

(73) Assignee: Honda Motor Co., Ltd., Tokyo (JP)

( * ) Notice: Subject to any disclaimer, the term of this patent is extended or adjusted under 35 U.S.C. 154(b) by 40 days.

(21) Appl. No.: 13/282,467

(22) Filed: Oct. 27, 2011

(65) Prior Publication Data
US 2012/0108383 A1 May 3, 2012

(30) Foreign Application Priority Data

Nov. 2, 2010 (JP) ................. 2010-246215

(51) Int. Cl.
*F16H 3/44* (2006.01)
(52) U.S. Cl.
USPC .......................... 475/286; 475/276
(58) Field of Classification Search
USPC .......................... 475/275–291, 903
See application file for complete search history.

(56) References Cited

U.S. PATENT DOCUMENTS

| | | | | |
|---|---|---|---|---|
| 8,277,355 | B2* | 10/2012 | Hart et al. | 475/282 |
| 8,343,007 | B2* | 1/2013 | Hart et al. | 475/288 |
| 2010/0041507 | A1* | 2/2010 | Gumpoltsberger et al. | 475/275 |
| 2011/0256977 | A1* | 10/2011 | Hart et al. | 475/275 |
| 2012/0065020 | A1* | 3/2012 | Mellet et al. | 475/275 |
| 2012/0108382 | A1* | 5/2012 | Saitoh et al. | 475/276 |
| 2012/0295754 | A1* | 11/2012 | Hart et al. | 475/275 |
| 2012/0295756 | A1* | 11/2012 | Lee et al. | 475/289 |

FOREIGN PATENT DOCUMENTS

| | | |
|---|---|---|
| JP | 2000-161450 | 6/2000 |
| JP | 2001-182785 | 7/2001 |
| JP | 2002-323098 | 11/2002 |
| JP | 2005-273768 | 10/2005 |

* cited by examiner

*Primary Examiner* — Erin D Bishop
*Assistant Examiner* — Huan Le
(74) *Attorney, Agent, or Firm* — Ditthavong Mori & Steiner, P.C.

(57) ABSTRACT

An automatic transmission includes an input shaft, an output member, a first planetary gear set, a second planetary gear set, a third planetary gear set, a fourth planetary gear set, and an engagement mechanism. Each of a plurality of gear ratios is provided by setting at least three of first to third clutches and first to third brakes in a connection state.

18 Claims, 7 Drawing Sheets

FIG. 3A

|     | B1 | B2  | B3 | C1 | C2 | C3 | F1 |
|-----|----|-----|----|----|----|----|----|
| Rvs |    | O   | O  |    |    | O  |    |
| 1st |    | (O) | O  |    | O  |    | O  |
| 2nd | O  | (O) |    |    | O  |    | O  |
| 3rd |    | (O) |    |    | O  | O  | O  |
| 4th | O  |     |    |    | O  | O  |    |
| 5th |    |     | O  |    | O  | O  |    |
| 6th |    |     |    | O  | O  | O  |    |
| 7th |    |     | O  | O  | O  |    |    |
| 8th |    |     | O  | O  |    | O  |    |
| 9th | O  |     |    | O  |    | O  |    |

FIG. 3B

|     | GEAR RATIO |
|-----|------------|
| Rvs | 3.318      |
| 1st | 4.766      |
| 2nd | 3.332      |
| 3rd | 2.334      |
| 4th | 1.670      |
| 5th | 1.392      |
| 6th | 1.000      |
| 7th | 0.825      |
| 8th | 0.585      |
| 9th | 0.498      |

FIG. 3C

|     | COMMON RATIO |
|-----|--------------|
| 1-2 | 1.430        |
| 2-3 | 1.428        |
| 3-4 | 1.397        |
| 4-5 | 1.200        |
| 5-6 | 1.392        |
| 6-7 | 1.212        |
| 7-8 | 1.409        |
| 8-9 | 1.176        |

FIG. 3D

| GEAR RATIO h | 2.350 |
|--------------|-------|
| GEAR RATIO i | 2.356 |
| GEAR RATIO j | 1.842 |
| GEAR RATIO k | 3.306 |
| RATIO RANGE  | 9.577 |

FIG. 6A

|      | B1 | B2  | B3 | C1 | C2 | C3 | F1 |
|------|----|-----|----|----|----|----|----|
| Rvs  |    | ○   | ○  |    |    | ○  |    |
| 1st  |    | (○) | ○  |    | ○  |    | ○  |
| 2nd  | ○  | (○) |    |    | ○  |    | ○  |
| 3rd  |    | (○) |    |    | ○  | ○  | ○  |
| 4th  | ○  |     |    |    | ○  | ○  |    |
| 5th  |    |     |    | ○  | ○  | ○  |    |
| 6th  |    |     |    | ○  | ○  | ○  |    |
| 7th  |    |     |    | ○  | ○  | ○  |    |
| 8th  |    |     |    | ○  | ○  |    | ○  |
| 9th  | ○  |     |    | ○  |    | ○  |    |

FIG. 6B

|      | GEAR RATIO |
|------|------------|
| Rvs  | 3.317      |
| 1st  | 4.767      |
| 2nd  | 3.332      |
| 3rd  | 2.334      |
| 4th  | 1.670      |
| 5th  | 1.392      |
| 6th  | 1.000      |
| 7th  | 0.825      |
| 8th  | 0.586      |
| 9th  | 0.498      |

FIG. 6C

|     | COMMON RATIO |
|-----|--------------|
| 1-2 | 1.430        |
| 2-3 | 1.428        |
| 3-4 | 1.398        |
| 4-5 | 1.200        |
| 5-6 | 1.392        |
| 6-7 | 1.212        |
| 7-8 | 1.409        |
| 8-9 | 1.177        |

FIG. 6D

| GEAR RATIO h | 2.348 |
|--------------|-------|
| GEAR RATIO i | 2.356 |
| GEAR RATIO j | 1.842 |
| GEAR RATIO k | 3.308 |
| RATIO RANGE  | 9.577 |

AUTOMATIC TRANSMISSION

CROSS-REFERENCE TO RELATED APPLICATIONS

The present application claims priority under 35 U.S.C. §119 to Japanese Patent Application No. 2010-246215, filed Nov. 2, 2010, entitled "Automatic transmission." The contents of this application are incorporated herein by reference in their entirety.

BACKGROUND OF THE INVENTION

1. Field of the Invention

The present invention relates to an automatic transmission.

2. Discussion of the Background

An automatic transmission capable of providing 8-forward-speed transmission using a first planetary gear set for input, second and third planetary gear sets for varying the speed, and six engagement mechanisms has been developed (refer to, for example, Japanese Unexamined Patent Application Publication No. 2005-273768).

According to Japanese Unexamined Patent Application Publication No. 2005-273768, the first planetary gear set for input is formed from a first sun gear, a first ring gear, and a first carrier that supports a pair of first pinions meshed with each other, one of which is meshed with the first sun gear and the other is meshed with the first ring gear. The first pinions can rotate about their own axes and revolve around the first sun gear. That is, the first planetary gear set is a so-called double-pinion planetary gear set. If the carrier is fixed, the sun gear and the ring gear rotate in the same direction. Accordingly, the planetary gear set is referred to as a "plus planetary gear set" or a "positive planetary gear set". Note that if the ring gear is fixed, the sun gear and the carrier rotate in opposite directions.

In the first planetary gear set, the first sun gear serves as a fixed element that is fixed to a transmission case, the first carrier serves as an input element that is connected to the input shaft, and the first ring gear serves as an output element that reduces the rotational speed of the first carrier serving as the input element and outputs the rotation.

In addition, each of the two planetary gear sets for changing the speed is formed from a Ravigneaux planetary gear set including a second sun gear, a third sun gear, a second ring gear integrated into a third ring gear, and a second carrier that supports a pair of second pinions meshed with each other, one of which is meshed with the second sun gear and the second ring gear and the other is meshed with the third sun gear. The second pinions can rotate about their own axes and revolve around the second sun gear.

Assume that in a collinear diagram (a diagram indicating a ratio of the relative speed of one rotary element to the speed of another rotary element in the form of a straight line) of the Ravigneaux planetary gear set, a first rotary element, a second rotary element, a third rotary element, and a fourth rotary element are arranged in sequence at intervals corresponding to the gear ratios. Then, the first rotary element corresponds to the second sun gear, the second rotary element corresponds to the second carrier integrated into the third carrier, the third rotary element corresponds to the second ring gear integrated into the third ring gear, and the fourth rotary element corresponds to the third sun gear.

The engagement mechanisms are formed from a first wet multiple disc clutch that releasably connects the first ring gear formed from the output element of the first planetary gear set to the fourth rotary element formed from the third sun gear, a second wet multiple disc clutch that releasably connects the input shaft to the second rotary element formed from the second carrier, a third wet multiple disc clutch that releasably connects the output element formed from the first ring gear to the first rotary element formed from the second sun gear, a fourth wet multiple disc clutch that releasably connects the input element formed from the first carrier to the first rotary element formed from the second sun gear, a first brake that releasably fixes the first rotary element formed from the second sun gear to the transmission case, and a second brake that releasably fixes the second rotary element formed from the second carrier to the transmission case.

According to such a configuration, by engaging the first wet multiple disc clutch with the second brake, a first gear ratio is obtained. In addition, by engaging the first wet multiple disc clutch with the first brake, a second gear ratio is obtained. By engaging the first wet multiple disc clutch with the third wet multiple disc clutch, a third gear ratio is obtained. By engaging the first wet multiple disc clutch with the fourth wet multiple disc clutch, a fourth gear ratio is obtained.

Furthermore, by engaging the first wet multiple disc clutch with the second wet multiple disc clutch, a fifth gear ratio is obtained. By engaging the second wet multiple disc clutch with the fourth wet multiple disc clutch, a sixth gear ratio is obtained. By engaging the second wet multiple disc clutch with the third wet multiple disc clutch, a seventh gear ratio is obtained. By engaging the second wet multiple disc clutch with the first brake, an eighth gear ratio is obtained.

In addition, an existing automatic transmission includes eight trains along the axis line of the input shaft. More specifically, from a side of a torque converter, a first train formed from the fourth clutch and the first brake, a second train is formed from the first planetary gear set, a third train is formed from the first clutch, a fourth train is formed from the third clutch (note that although the third clutch seems to be in the same train as the first planetary gear set in a skeleton diagram, a piston and a hydraulic pathway for the third clutch are formed between the first clutch and the output gear, in reality), a fifth train is formed from the output gear, a sixth train is formed from the second planetary gear set, a seventh train is formed from the third planetary gear set, and an eighth train is formed from the second clutch and the second brake.

SUMMARY OF THE INVENTION

According to one aspect of the present invention, an automatic transmission comprises an input shaft, an output member, a first planetary gear set, a second planetary gear set, a third planetary gear set, a fourth planetary gear set, and an engagement mechanism. The input shaft is rotatably arranged relative to a transmission case and is configured to be rotated with a driving force of a drive source relative to the transmission case. Rotation of the input shaft is changed into rotation at a plurality of rotational speeds through a plurality of gear ratios. The output member is to output rotation of the input shaft. The first planetary gear set includes a first sun gear, a first carrier, and a first ring gear. The second planetary gear set includes a second sun gear, a second carrier, and a second ring gear. The third planetary gear set includes a third sun gear, a third carrier, and a third ring gear. The fourth planetary gear set includes a fourth sun gear, a fourth carrier, and a fourth ring gear. Four elements of the second sun gear, the second carrier, the second ring gear, the third sun gear, the third carrier, and the third ring gear are defined as a first rotary element, a second rotary element, third rotary element, and the fourth rotary element in a collinear diagram illustrating ratios of relative rotational speeds of the first to fourth rotary elements as straight lines. The first rotary element, the second rotary element, the third rotary element, and the fourth rotary element are arranged in the collinear diagram in sequence from one side of the collinear diagram. The first sun gear, the first carrier, and the first ring gear are defined as a first element, a second element, and a third element in a collinear diagram illustrating ratios of relative rotational speeds of the first to third elements as straight lines. The first element, the second element, and the third element are arranged in sequence from one side of the collinear diagram at intervals corresponding to gear ratios of the first to third elements. The fourth sun gear, the fourth carrier, and the fourth ring gear are defined as a fourth element, a fifth element, and a sixth element in a collinear diagram illustrating ratios of relative rotational speeds of the fourth to sixth elements as straight lines. The fourth element, the fifth element, and the sixth element are arranged in sequence from one side of the collinear diagram at intervals corresponding to gear ratios of the fourth to sixth elements. The first element is connected to the input shaft. The fourth element is connected to the output member. The second element is connected to the sixth element to provide a first connected member. The second rotary element is connected to the fifth element to provide a second connected member. The engagement mechanism comprises a first clutch, a second clutch, a third clutch, a first brake, a second brake, and a third brake. The first clutch is configured to releasably connect the first element to the third rotary element. The second clutch is configured to releasably connect the first element to the first rotary element. The third clutch is configured to releasably connect the first connected member to the fourth rotary element. The first brake is configured to releasably connect the first connected member to the transmission case. The second brake is configured to releasably connect the third rotary element to the transmission case. The third brake is configured to releasably connect the third element to the transmission case. Each of the plurality of gear ratios is provided by setting at least three of the first to third clutches and the first to third brakes in a connection state.

According to another aspect of the present invention, an automatic transmission comprises an input shaft, an output member, a first planetary gear set, a second planetary gear set, a third planetary gear set, a fourth planetary gear set, and an engagement mechanism. The input shaft is rotatably arranged relative to a transmission case and is configured to be rotated with a driving force of a drive source. Rotation of the input shaft is changed into rotation at a plurality of rotational speeds through a plurality of gear ratios. The output member is to output rotation of the input shaft. The first planetary gear set includes a first sun gear, a first carrier, and a first ring gear. The second planetary gear set includes a second sun gear, a second carrier, and a second ring gear. The third planetary gear set includes a third sun gear, a third carrier, and a third ring gear. The fourth planetary gear set includes a fourth sun gear, a fourth carrier, and a fourth ring gear. The first sun gear, the first carrier, and the first ring gear are defined as a first element, a second element, and a third element in a collinear diagram illustrating ratios of relative rotational speeds of the first to third elements as straight lines. The first element, the second element, and the third element are arranged in sequence from one side of the collinear diagram at intervals corresponding to gear ratios of the first to third elements. The second sun gear, a second carrier, and a second ring gear are defined as a fourth element, a fifth element, and a sixth element in a collinear diagram illustrating ratios of relative rotational speeds of the fourth to sixth elements as straight lines. The fourth element, a fifth element, and a sixth element are arranged in sequence from one side of the collinear diagram at intervals corresponding to gear ratios of the fourth to sixth elements. The third sun gear, the third carrier, and the third ring gear are defined as a seventh element, an eighth element, and a ninth element in a collinear diagram illustrating ratios of relative rotational speeds of the seventh to ninth elements as straight lines. The seventh element, the eighth element, and the ninth element are arranged in sequence from one side of the collinear diagram at intervals corresponding to gear ratios of the seventh to ninth elements. The fourth sun gear, the fourth carrier, and the fourth ring gear are defined as a tenth element, an eleventh element, and a twelfth element in a collinear diagram illustrating ratios of relative rotational speeds of the tenth to twelfth elements as straight lines. The tenth element, the eleventh element, and the twelfth element are arranged in sequence from one side of the collinear diagram at intervals corresponding to gear ratios of the tenth to twelfth elements.

The second element is connected to the twelfth element to provide a first connected member. The seventh element is connected to the eleventh element to provide a second connected member. The first element is connected to the fourth element to provide a third connected member. The sixth element is connected to the ninth element to provide a fourth connected member. The third connected member is connected to the input shaft. The tenth element is connected to the output member. The engagement mechanism comprises a first clutch, a second clutch, a third clutch, a first brake, a second brake, and a third brake. The first clutch is configured to releasably connect the eighth element to the third connected member. The second clutch is configured to releasably connect the fifth element to the eighth element. The third clutch is configured to releasably connect the first connected member to the fourth connected member. The first brake is configured to releasably connect the first connected member to the transmission case. The second brake is configured to releasably connect the eighth element to the transmission case. The third brake is configured to releasably connect the third element to the transmission case. Each of the plurality of gear ratios is provided by setting at least three of the first to third clutches and the first to third brakes in a connection state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3A illustrates an engagement mechanism in each of the gear ratios of the automatic transmission according to the first exemplary embodiment of the present invention;

FIG. 3B illustrates an example of each of the gear ratios according to the first exemplary embodiment of the present invention;

FIG. 3C illustrates an example of the common ratios between the gear ratios according to the first exemplary embodiment of the present invention; and FIG. 3D illustrates an example of the gear ratios of the planetary gear sets and the ratio range of the automatic transmission according to the first exemplary embodiment of the present invention.

FIG. 6A illustrates an engagement mechanism in each of the gear ratios of the automatic transmission according to the second exemplary embodiment of the present invention;

FIG. 6B illustrates an example of each of the gear ratios according to the second exemplary embodiment of the present invention;

FIG. 6C illustrates an example of the common ratios between the gear ratios according to the second exemplary embodiment of the present invention; and FIG. 6D illustrates an example of the gear ratios of the planetary gear sets and the ratio range of the automatic transmission according to the second exemplary embodiment of the present invention.

DESCRIPTION OF THE EMBODIMENTS

Figure 1:
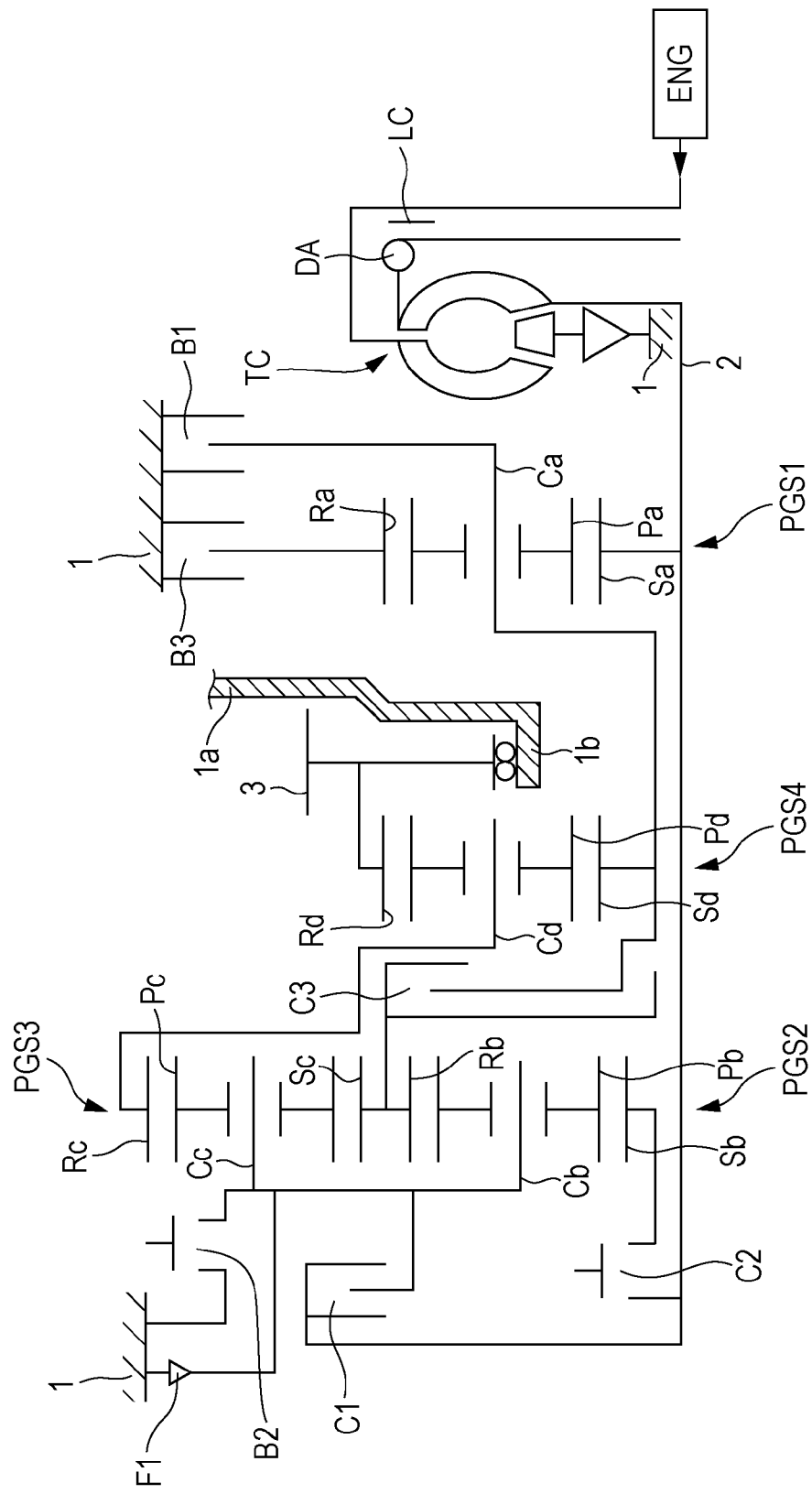
FIG. 1 is a skeleton diagram illustrating the upper half of an automatic transmission according to a first exemplary embodiment of the present invention.

The embodiments will now be described with reference to the accompanying drawings, wherein like reference numerals designate corresponding or identical elements throughout the various drawings.

First Exemplary Embodiment

FIG. 1 illustrates an automatic transmission according to a first exemplary embodiment of the present invention. According to the first exemplary embodiment, the automatic transmission includes an input shaft 2 rotatably supported in a transmission case 1 and an output member 3 that is formed from an output gear so as to be concentric with the input shaft 2. A driving force output from a drive source ENG, such as an internal combustion engine (an engine) (not shown), is transferred to the input shaft 2 via a torque converter TC including a lockup clutch LC and a damper DA. The rotation of the output member 3 is transferred to the right and left drive wheels of a vehicle via a differential gear and a propeller shaft (neither is shown). Note that instead of the torque converter TC, a friction engageable single-plate or multiple disc start clutch can be provided.

In the transmission case 1, first to fourth planetary gear sets PGS1 to PGS4 are arranged so as to be concentric with the input shaft 2.

The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier of a single-pinion planetary gear set is fixed, the sun gear and the ring gear rotate in opposite directions. Accordingly, a single-pinion planetary gear set is referred to as a "minus planetary gear set" or a "negative planetary gear set". Note that if the ring gear is fixed, the sun gear and the carrier rotate in the same direction.

Figure 2:
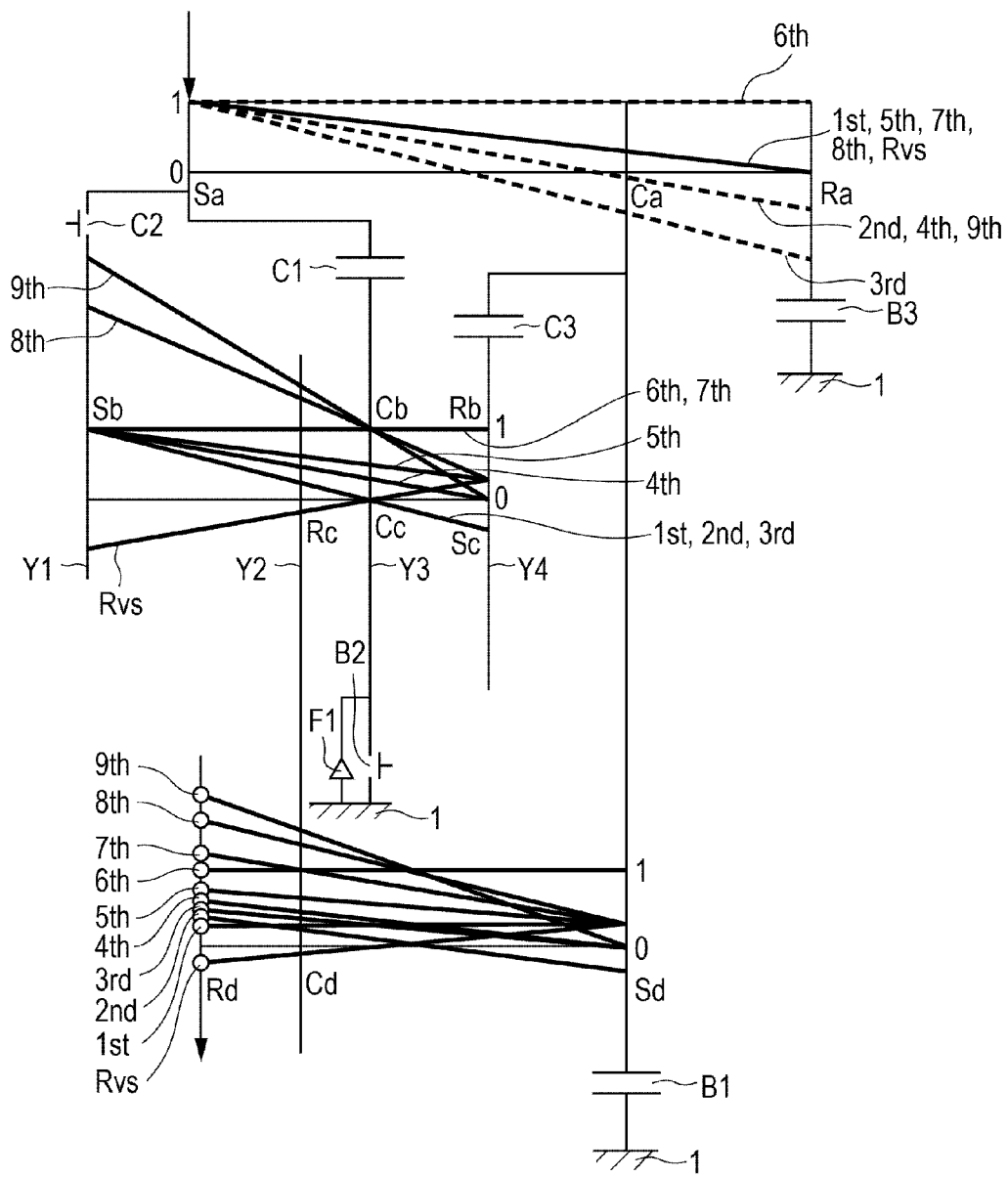
FIG. 2 is a collinear diagram illustrating the relative rotational speed ratios of first to fourth planetary gear sets of the automatic transmission according to the first exemplary embodiment of the present invention.
Figure 4:
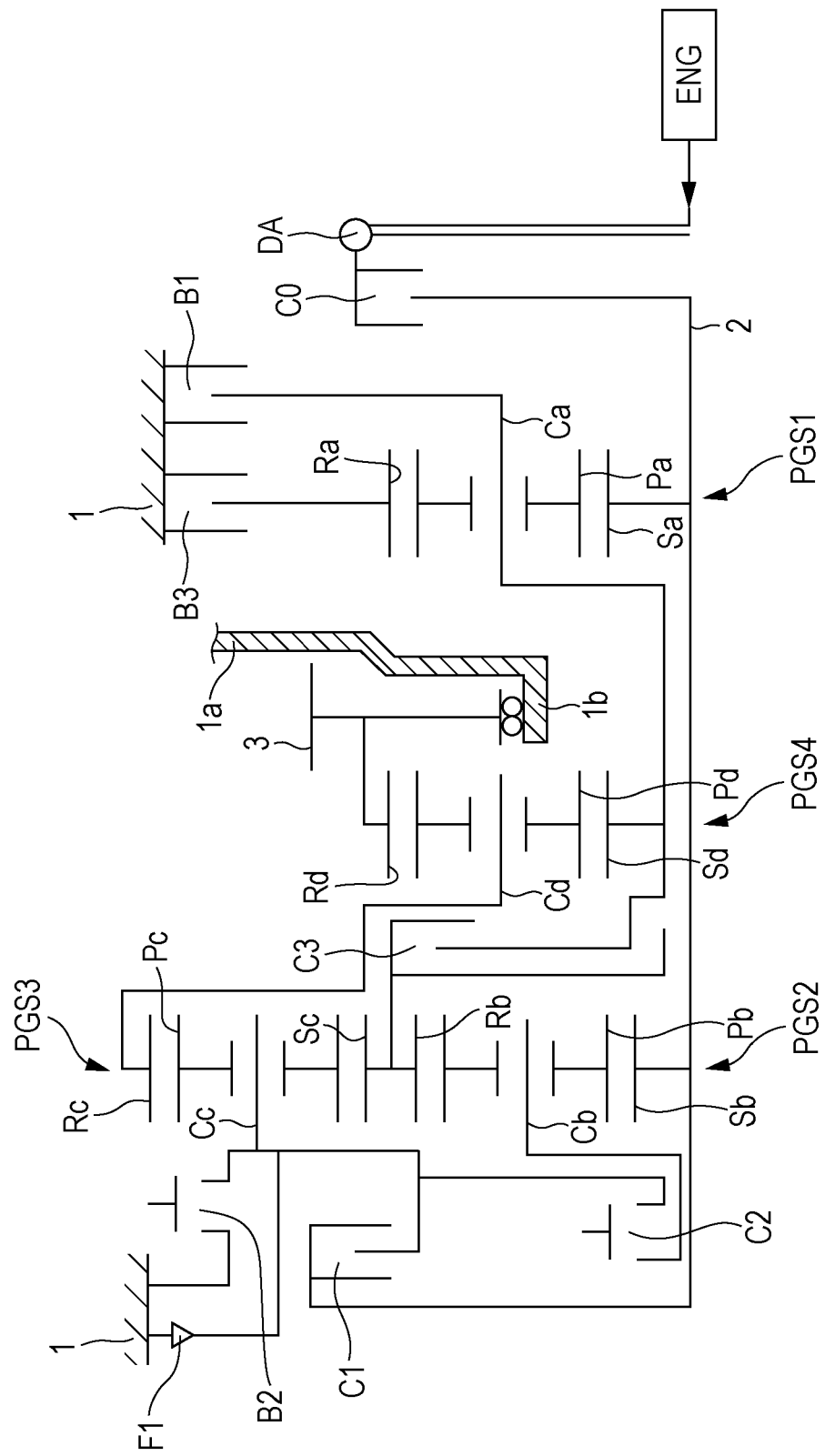
FIG. 4 is a skeleton diagram illustrating the upper half of an automatic transmission according to a second exemplary embodiment of the present invention.

Referring to a collinear diagram (a diagram indicating relative rotational speed ratios among three elements in the form of straight lines (speed lines)) of the first planetary gear set PGS1 shown in the upper section of FIG. 2, let three elements Sa, Ca, and Ra of the first planetary gear set PGS1 denote a first element, a second element, and a third element arranged from the left at intervals corresponding to the gear ratios. Then, the first element corresponds to the sun gear Sa, the second element corresponds to the carrier Ca, and the third element corresponds to the ring gear Ra. Let h denote the gear ratio of the first planetary gear set PGS1 (i.e., the number of teeth of the ring gear/the number of teeth of the sun gear). Then, the ratio of the distance between the sun gear Sa and the carrier Ca to the distance between the carrier Ca and the ring gear Ra is set to h:1.

Note that in the collinear diagram of the first planetary gear set PGS1, the lower horizontal line indicates that the rotational speed is "0". In contrast, the upper horizontal line indicates that the rotational speed is "1" when the rotational speed of the input shaft is set to "1".

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Furthermore, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

In the second planetary gear set PGS2 and the third planetary gear set PGS3, any two of the three elements of the second planetary gear set PGS2, that is, the sun gear, the ring gear, and the carrier, are connected to any two of the three elements of the third planetary gear set PGS3, that is, the sun gear, the ring gear, and the carrier. Thus, four rotary elements are formed. As illustrated in a collinear diagram (a diagram indicating relative rotational speed ratios among four rotary elements in the form of straight lines (speed lines)) of the second planetary gear set PGS2 and the third planetary gear set PGS3 shown in the middle section of FIG. 2, let Y1, Y2, Y3, and Y4 denote a first rotary element, a second rotary element, a third rotary element, and a fourth rotary element of the above-described rotary elements arranged from the left. Then, the first rotary element Y1 corresponds to the sun gear Sb of the second planetary gear set PGS2. The second rotary element Y2 corresponds to the ring gear Rc of the third planetary gear set PGS3, the third rotary element Y3 corresponds to the carrier Cb of the second planetary gear set PGS2 connected to the carrier Cc of the third planetary gear set PGS3, and the fourth rotary element Y4 corresponds to the ring gear Rb of the second planetary gear set PGS2 connected to the sun gear Sc of the third planetary gear set PGS3.

Note that in the collinear diagram of the second planetary gear set PGS2 and the third planetary gear set PGS3, the lower horizontal line indicates that the rotational speed is "0". In contrast, the upper horizontal line indicates that the rotational speed is "1" when the rotational speed of the input shaft is set to "1".

Let i denote the gear ratio of the second planetary gear set PGS2 and j denote the gear ratio of the third planetary gear set PGS3. Then, the distance between the first and second rotary elements, the distance between the second and third rotary elements, and the distance between the third and fourth rotary elements are in the ratio of ij-1:1:j.

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to a collinear diagram of the fourth planetary gear set PGS4 shown in the lower section of FIG. 2, let three elements Sd, Cd, and Rd of the fourth planetary gear set PGS4 denote a fourth element, a fifth element, and a sixth element arranged from the left. Then, the fourth element corresponds to the ring gear Rd, the fifth element corresponds to the carrier Cd, and the sixth element corresponds to the sun gear Sd. Let k denote the gear ratio of the fourth planetary gear set PGS4. Then, the ratio of the distance between the sun gear Sd and the carrier Cd to the distance between the carrier Cd and the ring gear Rd is set to k:1.

The sun gear Sa (the first element) of the first planetary gear set PGS1 is connected to the input shaft 2. In addition, the ring gear Rd (the fourth element) of the fourth planetary gear set PGS4 is connected to the output member 3 formed from an output gear.

The carrier Ca (the second element) of the first planetary gear set PGS1 is connected to the sun gear Sd (the sixth element) of the fourth planetary gear set PGS4 and, thus, a first connected member Ca-Sd is formed. In addition, the second rotary element Y2 is connected to the carrier Cd (the fifth element) of the fourth planetary gear set PGS4 and, thus, a second connected member Y2-Cd is formed.

Furthermore, according to the first exemplary embodiment, the automatic transmission includes first to third clutches C1 to C3 and first to third brakes B1 to B3 as engagement mechanisms.

The first clutch C1 is a wet multiple disc clutch. The first clutch C1 is configured to be switchable between a connection mode in which the sun gear Sa (the first element) of the first planetary gear set PGS1 is connected to the third rotary element Y3 and a release mode in which the sun gear Sa is disconnected from the third rotary element Y3.

The second clutch C2 serves as a meshing mechanism formed from a dog clutch or a synchromesh mechanism having a synchronization capability. The second clutch C2 is configured to be switchable between a connection mode in which the sun gear Sa (the first element) of the first planetary gear set PGS1 is connected to the first rotary element Y1 and a release mode in which the sun gear Sa is disconnected from the first rotary element Y1. Note that the second clutch C2 may be formed as a wet multiple disc clutch.

The third clutch C3 is a wet multiple disc clutch. The third clutch C3 is configured to be switchable between a connection mode in which the first connected member Ca-Sd is connected to the fourth rotary element Y4 and a release mode in which the first connected member Ca-Sd is disconnected from the fourth rotary element Y4.

The first brake B1 is a wet multiple disc brake. The first brake B1 is configured to be switchable between a fixed mode in which the first connected member Ca-Sd is fixed to the transmission case 1 and a release mode in which the first connected member Ca-Sd is unfixed from the transmission case 1.

The second brake B2 serves as a meshing mechanism formed from a dog clutch and a synchromesh mechanism having a synchronization capability. The second brake B2 is configured to be switchable between a fixed mode in which the third rotary element Y3 is fixed to the transmission case 1 and a release mode in which the third rotary element Y3 is unfixed from the transmission case 1.

In addition, according to the first exemplary embodiment, the automatic transmission includes a one-way clutch F1 that is disposed parallel to the second brake B2. The one-way clutch F1 allows the normal rotation of the third rotary element Y3 and inhibits the reverse rotation of the third rotary element Y3.

The third brake B3 is a wet multiple disc brake. The third brake B3 is configured to be switchable between a fixed mode in which the ring gear Ra (the third element) of the first planetary gear set PGS1 is fixed to the transmission case 1 and a release mode in which the ring gear Ra is unfixed from the transmission case 1.

The modes of the clutches C1 to C3 and the brakes B1 to B3 are switched by a transmission control unit (TCU) (not shown) on the basis of vehicle information, such as a traveling speed of the vehicle.

The third planetary gear set PGS3 is disposed outside of the second planetary gear set PGS2 in the radial direction. In addition, the ring gear Rb of the second planetary gear set PGS2 and the sun gear Sc of the third planetary gear set PGS3 are integrated into one body to form the fourth rotary element Y4. In this way, by disposing the third planetary gear set PGS3 outside of the second planetary gear set PGS2 in the radial direction, the second planetary gear set PGS2 overlaps the third planetary gear set PGS3 in the radial direction. Accordingly, the length of the automatic transmission in the axis direction can be decreased.

Note that the second planetary gear set PGS2 can at least partially overlap the third planetary gear set PGS3 in the radial direction. Thus, the length of the automatic transmission in the axis direction can be decreased. However, if the second planetary gear set PGS2 completely overlaps the third planetary gear set PGS3 in the radial direction, the length of the automatic transmission in the axis direction can be minimized.

The output member 3 formed from an output gear is disposed between the first planetary gear set PGS1 and the fourth planetary gear set PGS4. The transmission case 1 includes a side wall 1a between the output member 3 and the first planetary gear set PGS1. The side wall 1a inwardly extends in the radial direction. The side wall 1a includes a cylindrical portion 1b that extends inwardly in the radial direction of the output member 3. The output member 3 is rotatably supported by the cylindrical portion 1b via a bearing. Such a configuration allows the cylindrical portion 1b that is connected to the transmission case 1 and that has a high mechanical strength to firmly support the output member 3 in a rotatable manner.

The cases in which the gear ratios of the automatic transmission according to the first exemplary embodiment are established are described next with reference to FIG. 2 and FIGS. 3A to 3D.

In order to establish a first gear ratio, the second clutch C2 is set in a connection mode, and the third brake B3 is set in a fixed mode. By setting the third brake B3 in the fixed mode, the rotational speed of the ring gear Ra (the third element) of the first planetary gear set PGS1 is set to "0". In addition, by setting the second clutch C2 in the connection mode, the sun gear Sa (the first element) of the first planetary gear set PGS1 is connected to the first rotary element Y1. Thus, the sun gear Sa and the first rotary element Y1 rotate at the same speed "1". In addition, due to the operation performed by the one-way clutch F1, the rotational speed of the third rotary element Y3 is set to "0". Thus, the rotational speed of the ring gear Rd (the fourth element) of the fourth planetary gear set PGS4 connected to the output member 3 is set to "1st" shown in FIG. 2. In this way, the first gear ratio is established.

Note that in the first gear ratio, the second brake B2 is in a release mode. Accordingly, the number of releases of the engagement mechanism is "4". However, since the second brake B2 is formed from a meshing mechanism, friction loss can be reduced even in the release mode, as compared with the case in which the second brake B2 is a wet multiple disc brake. In addition, the rotational speed of the third rotary element Y3 is set to "0" due to the operation performed by the one-way clutch F1. Accordingly, even when the second brake B2 is formed as a wet multiple disc brake, the friction loss does not occur in the second brake B2. Therefore, in the first gear ratio, the actual number of releases is "3".

Furthermore, even in the first gear ratio, by setting the second brake B2 in a fixed mode, engine brake can be activated.

In order to establish a second gear ratio, the second clutch C2 is set in a connection mode, and the first brake B1 is set in a fixed mode. By setting the first brake B1 in the fixed mode, the rotational speed of the first connected member Ca-Sd is set to "0". In addition, by setting the second clutch C2 in the connection mode, the sun gear Sa (the first element) of the first planetary gear set PGS1 is connected to the first rotary element Y1 and, thus, the sun gear Sa and the first rotary element Y1 rotate at the same speed "1". In addition, the rotational speed of the third rotary element Y3 is set to "0" due to the operation performed by the one-way clutch F1. Furthermore, the rotational speed of the ring gear Rd (the fourth element) of the fourth planetary gear set PGS4 connected to the output member 3 is set to "2nd" shown in FIG. 2. In this way, the second gear ratio is established.

Note that in the second gear ratio, the second brake B2 is in a release mode. Accordingly, the number of releases of the engagement mechanism is "4". However, as in the first gear ratio, friction loss does not occur in the second brake B2. Therefore, in the second gear ratio, the actual number of releases is "3".

Furthermore, as in the first gear ratio, in the second gear ratio, by setting the second brake B2 in a fixed mode, engine brake can be activated.

In order to establish a third gear ratio, the second clutch C2 and the third clutch C3 are set in a connection mode. By setting the second clutch C2 in the connection mode, the sun gear Sa (the first element) of the first planetary gear set PGS1 and the first rotary element Y1 rotate at the same speed "1". In addition, by setting the third clutch C3 in the connection mode, the first connected member Ca-Sd is connected to the fourth rotary element Y4 and, thus, the first connected member Ca-Sd and the fourth rotary element Y4 rotate at the same speed. Furthermore, due to the operation performed by the one-way clutch F1, the rotational speed of the third rotary element Y3 is set to "0". The rotational speed of the ring gear Rd (the fourth element) of the fourth planetary gear set PGS4 connected to the output member 3 is set to "3rd" shown in FIG. 2. In this way, the third gear ratio is established.

Note that in the third gear ratio, the second brake B2 is in a release mode. Accordingly, the number of releases of the engagement mechanism is "4". However, as in the first and second gear ratios, friction loss does not occur in the second brake B2. Therefore, in the third gear ratio, the actual number of releases is "3".

Furthermore, even in the third gear ratio, by setting the second brake B2 in a fixed mode, engine brake can be activated.

In order to establish a fourth gear ratio, the second clutch C2 and the third clutch C3 are set in a connection mode. In addition, the first brake B1 is set in the fixed mode. By setting the second clutch C2 in the connection mode, the sun gear Sa (the first element) of the first planetary gear set PGS1 and the first rotary element Y1 rotate at the same speed "1". In addition, by setting the first brake B1 in the fixed mode, the rotational speed of the first connected member Ca-Sd is set to "0". Furthermore, by setting the third clutch C3 in the connection mode, the first connected member Ca-Sd is connected to the fourth rotary element Y4 and, thus, the rotational speeds of the first connected member Ca-Sd and the fourth rotary element Y4 are set to "0". The rotational speed of the ring gear Rd (the fourth element) of the fourth planetary gear set PGS4 connected to the output member 3 is set to "4th" shown in FIG. 2. In this way, the fourth gear ratio is established.

In order to establish a fifth gear ratio, the second clutch C2 and the third clutch C3 are set in a connection mode. In addition, the third brake B3 is set in a fixed mode. By setting the second clutch C2 in the connection mode, the sun gear Sa (the first element) of the first planetary gear set PGS1 and the first rotary element Y1 rotate at the same speed "1". In addition, by setting the third clutch C3 in the connection mode, the first connected member Ca-Sd is connected to the fourth rotary element Y4 and, thus, the first connected member Ca-Sd and the fourth rotary element Y4 rotate at the same speed. In addition, by setting the third brake B3 in the fixed mode, the rotational speed of the ring gear Ra (the third element) of the first planetary gear set PGS1 is set to "0". Thus, the rotational speed of the ring gear Rd (the fourth element) of the fourth planetary gear set PGS4 connected to the output member 3 is set to "5th" shown in FIG. 2. In this way, the fifth gear ratio is established.

In order to establish a sixth gear ratio, the first to third clutches C1 to C3 are set in a connection mode. By setting the first clutch C1 and the second clutch C2 in the connection mode, the first rotary element Y1 and the third rotary element Y3 rotate at the same speed "1". The first to fourth rotary elements Y1 to Y4 enter a lock mode in which relative rotation of the rotary elements is not allowed. Thus, the first to fourth rotary elements Y1 to Y4 rotate at the speed "1". In addition, by setting the third clutch C3 in the connection mode, the first connected member Ca-Sd rotates at the speed "1" which is the same as the rotational speed of the fourth rotary element Y4.

Accordingly, the fourth to sixth elements Rd, Cd, and Sd of the fourth planetary gear set PGS4 also enter a lock mode in which relative rotation of the elements is not allowed. The rotational speed of the ring gear Rd (the fourth element) of the fourth planetary gear set PGS4 connected to the output member 3 is set to "6th" (i.e., "1"). In this way, the sixth gear ratio is established.

In order to establish a seventh gear ratio, the first clutch C1 and the second clutch C2 are set in the connection mode. In addition, the third brake B3 is set in the fixed mode. By setting the first clutch C1 and the second clutch C2 in the connection mode, the first rotary element Y1 and the third rotary element Y3 rotate at the same speed "1". The first to fourth rotary elements Y1 to Y4 enter a lock mode in which relative rotation of the rotary elements is not allowed. Thus, the first to fourth rotary elements Y1 to Y4 rotate at the speed "1". Accordingly, the rotational speed of the second connected member Y2-Cd is set to "1".

In addition, by setting the third brake B3 in the fixed mode, the rotational speed of the ring gear Ra (the third element) of the first planetary gear set PGS1 is set to "0". Furthermore, the rotational speed of the ring gear Rd (the fourth element) of the fourth planetary gear set PGS4 connected to the output member 3 is set to "7th" shown in FIG. 2. In this way, the seventh gear ratio is established.

In order to establish an eighth gear ratio, the first clutch C1 and the third clutch C3 are set in the connection mode. In addition, the third brake B3 is set in the fixed mode. By setting the first clutch C1 in the connection mode, the sun gear Sa (the first element) of the first planetary gear set PGS1 is connected to the third rotary element Y3 and, thus, the sun gear Sa and the third rotary element Y3 rotate at the speed "1". In addition, by setting the third clutch C3 in the connection mode, the first connected member Ca-Sd and the fourth rotary element Y4 rotate at the same speed.

Furthermore, by setting the third brake B3 in the fixed mode, the rotational speed of the ring gear Ra (the third element) of the first planetary gear set PGS1 is set to "0". The rotational speed of the ring gear Rd (the fourth element) of the fourth planetary gear set PGS4 connected to the output member 3 is set to "8th" shown in FIG. 2. In this way, the eighth gear ratio is established.

In order to establish a ninth gear ratio, the first clutch C1 and the third clutch C3 are set in the connection mode. In addition, the first brake B1 is set in the fixed mode. By setting the first clutch C1 in the connection mode, the sun gear Sa (the first element) of the first planetary gear set PGS1 is connected to the third rotary element Y3 and, thus, the sun gear Sa and the third rotary element Y3 rotate at the speed "1". Furthermore, by setting the first brake B1 in the fixed mode, the rotational speed of the first connected member Ca-Sd is set to "0".

In addition, by setting the third clutch C3 in the connection mode, the first connected member Ca-Sd is connected to the fourth rotary element Y4 and, thus, the rotational speeds of the first connected member Ca-Sd and the fourth rotary element Y4 are set to "0". The rotational speed of the ring gear Rd (the fourth element) of the fourth planetary gear set PGS4 connected to the output member 3 is set to "9th" shown in FIG. 2. In this way, the ninth gear ratio is established.

In order to establish a reverse gear, the third clutch C3 is set in the connection mode, and the second brake B2 and the third brake B3 are set in the fixed mode. By setting the third clutch C3 in the connection mode, the first connected member Ca-Sd and the fourth rotary element Y4 rotate at the same speed. In addition, by setting the second brake B2 in the fixed mode, the rotational speed of the third rotary element Y3 is set to "0".

Furthermore, by setting the third brake B3 in the fixed mode, the rotational speed of the ring gear Ra (the third element) of the first planetary gear set PGS1 is set to "0". Still furthermore, the rotational speed of the ring gear Rd (the fourth element) of the fourth planetary gear set PGS4 connected to the output member 3 is set to "Rvs" representing the reverse rotation (rotation in a direction in which the vehicle moves backwards) shown in FIG. 2. In this way, the reverse gear is established.

Note that the speed line indicated by a dotted line in FIG. 2 indicates that among the first to fourth planetary gear set PGS1 to PGS4, elements of the planetary gear sets other than the planetary gear set that transfers drive power rotate (rotate freely) while following the planetary gear set that transfers drive power.

FIG. 3A illustrates all the modes of the clutches C1 to C3, the brakes B1 to B3, and the one-way clutch F1 in the above-described gear ratios. The symbol "O" in the columns of the clutches C1 to C3 and brakes B1 to B3 indicates the connection mode or the fixed mode. The empty cells indicate the release mode. In addition, the symbol "0" in the column of the one-way clutch F1 indicates that the rotational speed of the third rotary element Y3 is set to "0" due to the operation performed by the one-way clutch F1.

FIG. 3B illustrates the gear ratios (the rotational speed of the input shaft 2/the rotational speed of the output member 3) in the first to ninth gears when the gear ratio h of the first planetary gear set PGS1 is set to 2.350, the gear ratio i of the second planetary gear set PGS2 is set to 2.356, the gear ratio j of the third planetary gear set PGS3 is set to 1.842, and the gear ratio k of the fourth planetary gear set PGS4 is set to 3.306, as shown in FIG. 3D. As can be seen from FIGS. 3B and 3C, the common ratio (the ratio of one of the gear ratios to the next gear ratio) has an appropriate value. In addition, the ratio range (the first gear ratio/the ninth gear ratio) shown in FIG. 3D can have an appropriate value.

According to the first exemplary embodiment, the automatic transmission can provide nine forward gear ratios. In addition, in each of the gear ratios, the number of releases of the wet multiple disc clutch and the wet multiple disc brake is less than or equal to 3. Thus, friction loss can be reduced and, therefore, the transmission efficiency of the driving force can be increased.

In addition, let the gear ratios be defined as follows: the seventh gear ratio is defined as a predetermined middle gear ratio, the first gear ratio to the seventh gear ratio, which is the predetermined middle gear ratio, are defined as a low speed gear range, and the eighth gear ratio to the ninth gear ratio that are higher than the seventh gear ratio, which is the predetermined middle gear ratio, are defined as a high speed gear range. Then, in the high speed gear range from the eighth gear ratio to the ninth gear ratio that are higher than the seventh gear ratio, which is the predetermined middle gear ratio, the second clutch C2 formed from a meshing mechanism having friction loss lower than that of the wet multiple disc clutch is in a release mode.

In addition, the second brake B2 that is in the release mode for all of the gear ratios other than the reverse gear is also formed from a meshing mechanism. Accordingly, in the high speed gear range, the number of releases of the wet multiple disc clutch and the wet multiple disc brake is set to 1. Thus, friction loss can be reduced when the vehicle travels in a high speed gear range and, therefore, fuel consumption can be reduced.

Furthermore, in the range from the seventh gear ratio, which is the predetermined middle gear ratio, to the eighth gear ratio, the second clutch C2 formed from a meshing mechanism is switched only between the connection mode and the release mode. The transmission torque (the transmission driving force) of the third clutch C3 at the seventh gear ratio (at the predetermined middle gear ratio) is relatively small. Accordingly, even when the second clutch C2 is formed from a dog clutch serving as a meshing mechanism, switch between a connection mode and a release mode can be smoothly performed when the seventh gear ratio is shifted to the eighth gear ratio and vice versa.

Still furthermore, all of the planetary gear sets PGS1 to PGS4 are formed from single pinion planetary gear sets. Accordingly, the number of meshes between the gears in the transmission path of the driving force can be reduced, as compared with a double-pinion planetary gear set including a sun gear, a ring gear, and a carrier that supports a pair of pinions meshed with each other, one of which is meshed with the sun gear and the other is meshed with the ring gear so that the pinions are rotatable about their axes and are revolvable around the sun gear (when the carrier is fixed, the sun gear and the ring gear rotate in the same directions. Accordingly, a double-pinion planetary gear set is referred to as a "plus planetary gear set" or a "positive planetary gear set". Note that if the ring gear is fixed, the sun gear and the carrier rotate in opposite directions.) Therefore, the transmission efficiency can be increased.

Yet still furthermore, since the one-way clutch F1 is formed together with the second brake B2, the need for switching the mode of the second brake B2 when third gear is shifted to fourth gear and vice versa can be eliminated. Thus, the transmission controllability can be improved.

Note that while the first exemplary embodiment has been described with reference to the second clutch C2 and the second brake B2 each formed from a meshing mechanism, the second clutch C2 and the second brake B2 may be formed from the wet multiple disc clutch and the wet multiple disc brake. Even in such a case, the advantage of the embodiment of the present invention can be provided. That is, the number of releases of the wet multiple disc clutch and the number of releases in each of the gear ratios can be less than or equal to three. Thus, friction loss can be reduced.

In addition, the one-way clutch F1 may be removed. In such a case, the second brake B2 can be in the fixed mode when the first to third gear ratios are established. Furthermore, if the one-way clutch F1 is removed, the second brake B2 may be formed from a two-way clutch that can switch between the fixed mode in which the third rotary element Y3 is fixed to the transmission case 1 and a reverse rotation prevention mode in which the normal rotation of the third rotary element Y3 is allowed and the reverse rotation of the third rotary element Y3 is inhibited. An example of such a two-way clutch is described in more detail with reference to FIGS. 7A to 7C.

Figure 7A:
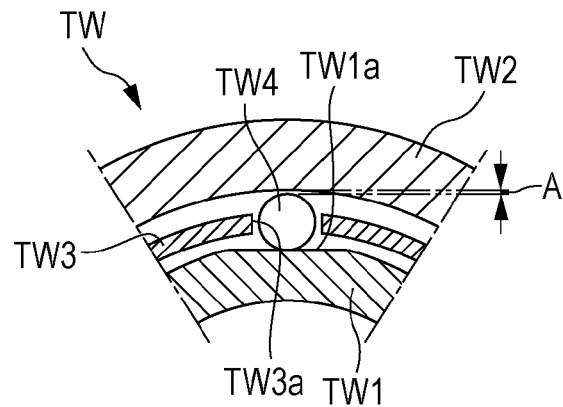
FIGS. 7A to 7C are cross-sectional views of an example of a two-way clutch serving as a second brake.
Figure 7B:
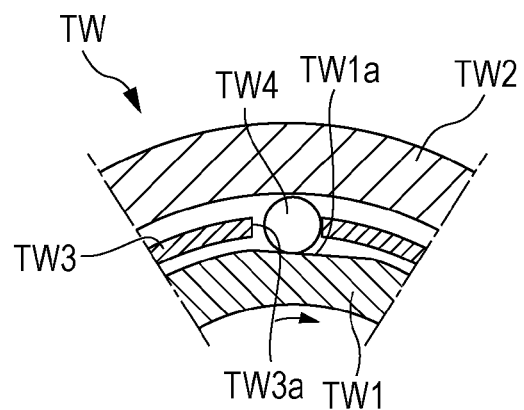
Figure 7C:
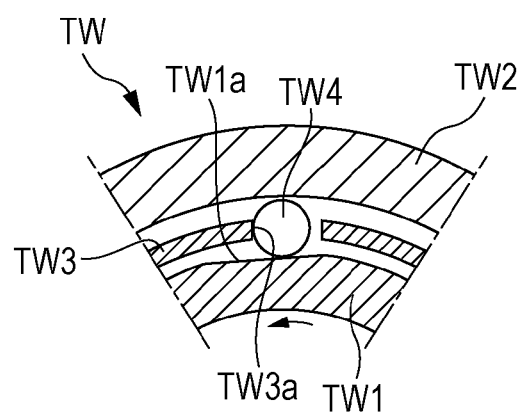

As shown in FIGS. 7A to 7C, a two-way clutch TW serving as the second brake B2 includes an inner ring TW1 connected to the third rotary element Y3, an outer ring TW2 disposed outside of the inner ring TW1 in the radial direction with a distance therebetween and connected to the transmission case 1, and a holding ring TW3 disposed between the inner ring TW1 and the outer ring TW2.

The inner ring TW1 has a plurality of cam surfaces TW1a formed in the outer peripheral surface thereof. The holding ring TW3 has a plurality of notch holes TW3a that correspond to the cam surfaces TW1a. Each of the notch holes TW3a contains a roller TW4. The two-way clutch TW further includes first and second electromagnetic clutches (neither is shown). When energized, the first electromagnetic clutch connects the outer ring TW2 to the holding ring TW3. When the first electromagnetic clutch is not energized, the holding ring TW3 is rotatable relative to each of the inner ring TW1 and the outer ring TW2.

In addition, the diameter of the roller TW4 is determined so that, as shown in FIG. 7A, a gap A is open when the roller TW4 is located in the middle of the cam surface TW1a and, as shown in FIGS. 7B and 7C, the roller TW4 is in contact with the inner ring TW1 and the outer ring TW2 when the roller TW4 is located at an end of the cam surface TW1a.

When the first electromagnetic clutch is not energized, the holding ring TW3 is freely rotatable. Thus, as shown in FIG. 7A, the roller TW4 can continue to be located in the middle of the cam surfaces TW1a. Accordingly, in the two-way clutch TW, the inner ring TW1 is freely rotatable.

When the first electromagnetic clutch is energized, the holding ring TW3 is fixed to the transmission case 1 via the outer ring TW2. In this case, as shown in FIGS. 7B and 7C, even when the inner ring TW1 attempts to rotate in the forward direction or the reverse direction, the roller TW4 is located at an end of the cam surfaces TW1a since the holding ring TW3 is fixed.

At that time, the roller TW4 is sandwiched by the cam surfaces TW1a and the inner peripheral surface of the outer ring TW2. Thus, the rotation of the inner ring TW1 is prevented. That is, the two-way clutch TW enters the fixed mode.

The second electromagnetic clutch is configured to be switchable among the following three modes: a first mode in which when, as shown in FIG. 7B, the notch holes TW3a is located at one end of the cam surface TW1a, the holding ring TW3 is connected to the inner ring TW1, a second mode in which when, as shown in FIG. 7C, the notch hole TW3a is located at the other end of the cam surfaces TW1a, the holding ring TW3 is connected to the inner ring TW1, and a release mode in which the holding ring TW3 is disconnected from the inner ring TW1.

In FIGS. 7A to 7C, let the reverse direction be a clockwise direction. Then, by causing the two-way clutch TW to enter a mode in which the first electromagnetic clutch is not energized (a power-off mode) and the outer ring TW2 is disconnected from the holding ring TW3 and causing the second electromagnetic clutch to enter the first mode, the reverse rotation can be prevented.

If the second brake B2 is formed from the two-way clutch TW described above, all of the gear ratios can be established by setting the two-way clutch TW in the fixed mode in the first to third forward gears and the reverse gear and setting the two-way clutch TW in the reverse rotation prevention mode in the fourth to ninth forward gears.

If the second brake B2 is formed from the two-way clutch TW described above, friction loss of the second brake B2 does not occur, unlike the case in which the second brake B2 is formed from a frictional engagement brake. Accordingly, as in the case in which the second brake B2 is formed from a meshing mechanism, the entire friction loss of the automatic transmission can be reduced.

Note that it is desirable that if upshift to fourth gear is anticipated on the basis of the vehicle information, such as the traveling speed, while the vehicle is traveling in third gear, a transmission control unit (not shown) preset the two-way clutch TW serving as the second brake B2 in the reverse rotation prevention mode.

In this way, like the advantage provided by the one-way clutch F1, when upshift from third gear to fourth gear occurs, switching of the mode of the two-way clutch TW serving as the second brake B2 has already been completed. Thus, by only setting the first brake B1 in the fixed mode, upshift to fourth gear can be performed. Accordingly, the upshift to fourth gear can be smoothly performed and, therefore, the transmission controllability of the automatic transmission can be improved.

In addition, the two-way clutch TW having the above-described configuration can switch among the release mode in which the third rotary element Y3 is unfixed from the transmission case 1 and a normal rotation prevention mode in which the normal rotation of the third rotary element Y3 is prevented in addition to the above-described fixed mode and reverse rotation prevention mode.

More specifically, by setting the first electromagnetic clutch in a power-off mode and setting the second electromagnetic clutch in the release mode, the two-way clutch TW enters a mode in which, as shown in FIG. 7A, each of the rollers TW4 is continuously located in the middle of one of the cam surfaces TW1a. Thus, the two-way clutch TW enters a mode in which the inner ring TW1 is freely rotatable with respect to the outer ring TW2, that is, the release mode.

In addition, by setting the first electromagnetic clutch in the power-off mode and setting the second electromagnetic clutch in the second mode in which, as shown in FIG. 7C, each of the notch holes TW3a is placed at the other end of one of the cam surfaces TW1a and, thus, the holding ring TW3 is connected to the inner ring TW1, the two-way clutch TW enters the mode in which the normal rotation of the inner ring TW1 is prevented and the reverse rotation of the inner ring TW1 is allowed, that is, the normal rotation prevention mode.

Accordingly, the second electromagnetic clutch of the above-described two-way clutch TW can be removed, and the two-way clutch TW serving as the second brake B2 can be switched only between the fixed mode and the release mode by switching the first electromagnetic clutch. In such a case, by setting the two-way clutch TW in the fixed mode in first to third gears and reverse gear and switching the mode to the release mode in fourth to ninth gears, all of the gear ratios can be established.

Furthermore, while the first exemplary embodiment has been described with reference to a 9-forward-speed transmission, the present invention is not limited thereto. For example, by removing second gear, fourth gear, and ninth gear, a 6-forward-speed transmission can be provided.

Second Exemplary Embodiment

An automatic transmission according to a second exemplary embodiment of the present invention is described below with reference to FIGS. 4 and 5 and FIGS. 6A to 6D. According to the second exemplary embodiment, the automatic transmission includes an input shaft 2 rotatably supported in the transmission case 1 and an output member 3 disposed so as to be concentric with the input shaft 2 and formed from an output gear. A drive force output from a drive source ENG, such as an internal combustion engine (an engine) (not shown) is transferred to the input shaft 2 via a damper DA that absorbs a torque variation and a friction engageable single-disc or multiple disc start clutch C0. The rotation of the output member 3 is transferred to the right and left drive wheels of the vehicle via a differential gear and a propeller shaft (neither is shown). Note that instead of the multiple disc start clutch C0 and the damper DA, the torque converter TC described in the first exemplary embodiment can be used.

In the transmission case 1, first to fourth planetary gear sets PGS1 to PGS4 are arranged so as to be concentric with the input shaft 2.

The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier of a single-pinion planetary gear set is fixed, the sun gear and the ring gear rotate in opposite directions. Accordingly, a single-pinion planetary gear set is referred to as a "minus planetary gear set" or a "negative planetary gear set". Note that if the ring gear is fixed, the sun gear and the carrier rotate in the same direction.

Figure 5:
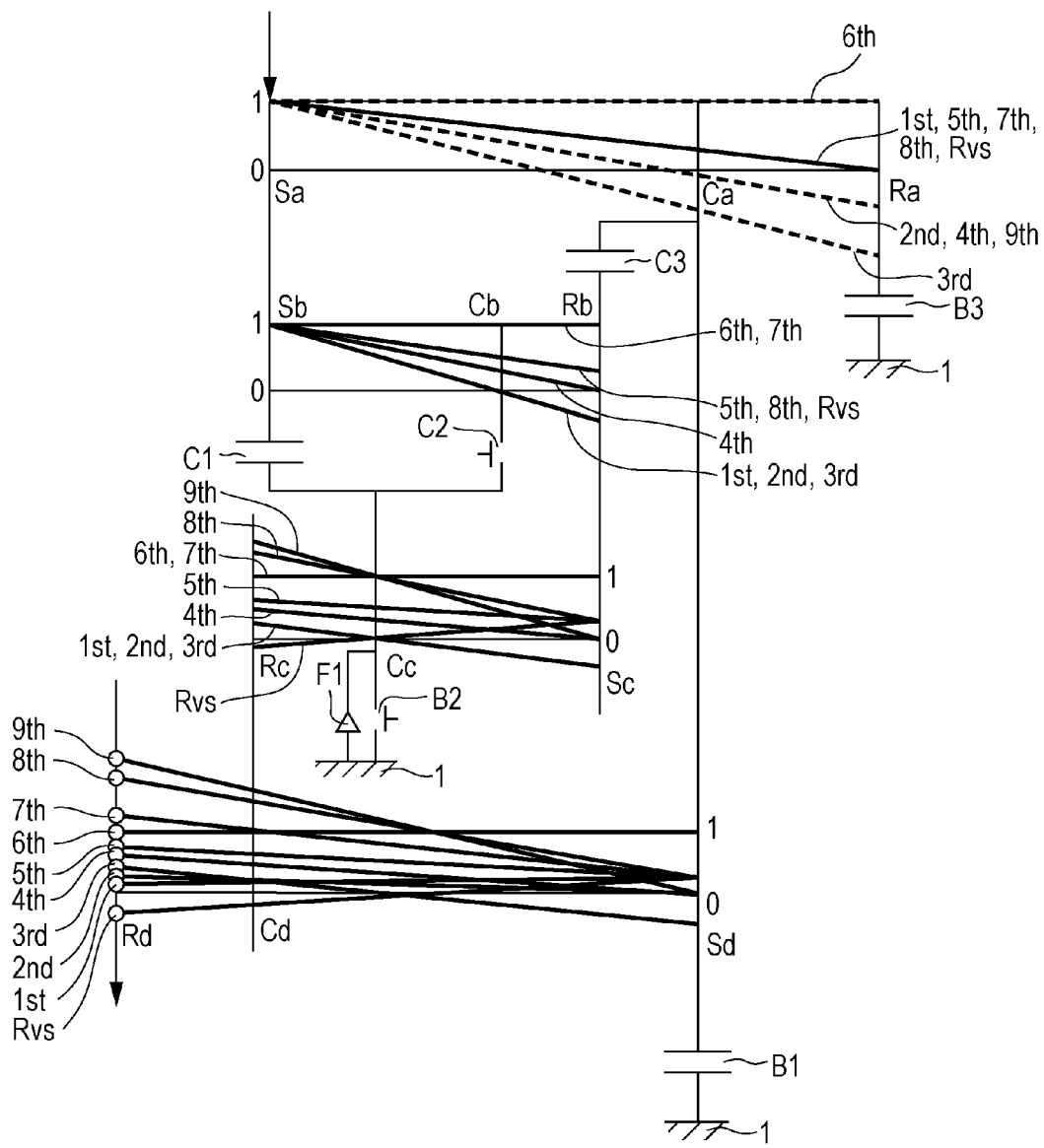
FIG. 5 is a collinear diagram illustrating the relative rotational speed ratios of first to fourth planetary gear sets of the automatic transmission according to the second exemplary embodiment of the present invention.

Referring to a collinear diagram (a diagram indicating relative rotational speed ratios among three elements in the form of straight lines (speed lines)) of the first planetary gear set PGS1 shown in a first section of FIG. 5 from the top, let three elements Sa, Ca, and Ra of the first planetary gear set PGS1 denote a first element, a second element, and a third element arranged from the left at intervals corresponding to the gear ratios. Then, the first element corresponds to the sun gear Sa, the second element corresponds to the carrier Ca, and the third element corresponds to the ring gear Ra. Let h denote the gear ratio of the first planetary gear set PGS1 (i.e., the number of teeth of the ring gear/the number of teeth of the sun gear). Then, the ratio of the distance between the sun gear Sa and the carrier Ca to the distance between the carrier Ca and the ring gear Ra is set to h:1.

Note that in the collinear diagram of the first planetary gear set PGS1, the lower horizontal line indicates that the rotational speed is "0". In contrast, the upper horizontal line indicates that the rotational speed is "1" when the rotational speed of the input shaft is set to "1".

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Referring to a collinear diagram (a diagram indicating relative rotational speed ratios among three elements in the form of straight lines (speed lines)) of the second planetary gear set PGS2 shown in a second section of FIG. 5 from the top, let three elements Sb, Cb, and Rb of the second planetary gear set PGS2 denote a fourth element, a fifth element, and a sixth element arranged from the left at intervals corresponding to the gear ratios. Then, the fourth element corresponds to the sun gear Sb, the fifth element corresponds to the carrier Cb, and the sixth element corresponds to the ring gear Rb. Let i denote the gear ratio of the second planetary gear set PGS2 (i.e., the number of teeth of the ring gear/the number of teeth of the sun gear). Then, the ratio of the distance between the sun gear Sb and the carrier Cb to the distance between the carrier Cb and the ring gear Rb is set to i:1.

Similarly, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

Referring to a collinear diagram (a diagram indicating relative rotational speed ratios among three elements in the form of straight lines (speed lines)) of the third planetary gear set PGS3 shown in a third section of FIG. 5 from the top, let three elements Sc, Cc, and Rc of the third planetary gear set PGS3 denote a seventh element, an eighth element, and a ninth element arranged from the left at intervals corresponding to the gear ratios. Then, the seventh element corresponds to the sun gear Rc, the eighth element corresponds to the carrier Cc, and the ninth element corresponds to the sun gear Sc. Let j denote the gear ratio of the third planetary gear set PGS3 (i.e., the number of teeth of the ring gear/the number of teeth of the sun gear). Then, the ratio of the distance between the sun gear Sc and the carrier Cc to the distance between the carrier Cc and the ring gear Rc is set to j:1.

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to a collinear diagram (a diagram indicating relative rotational speed ratios among three elements in the form of straight lines (speed lines)) of the fourth planetary gear set PGS4 shown in a fourth section of FIG. 5 from the top, let three elements Sd, Cd, and Rd of the fourth planetary gear set PGS4 denote a tenth element, an eleventh element, and a twelfth element arranged from the left at intervals corresponding to the gear ratios. Then, the tenth element corresponds to the ring gear Rd, the eleventh element corresponds to the carrier Cd, and the twelfth element corresponds to the sun gear Sd. Let k denote the gear ratio of the fourth planetary gear set PGS4. Then, the ratio of the distance between the sun gear Sd and the carrier Cd to the distance between the carrier Cd and the ring gear Rd is set to k:1.

In addition, in the automatic transmission according to the second exemplary embodiment, the carrier Ca (the second element) of the first planetary gear set PGS1 is connected to the sun gear Sd (the twelfth element) of the fourth planetary gear set PGS4 and, thus, a first connected member Ca-Sd is formed. Furthermore, the ring gear Rc (the seventh element) of the third planetary gear set PGS3 is connected to the carrier Cd (the eleventh element) of the fourth planetary gear set PGS4 and, thus, a second connected member Rc-Cd is formed.

In addition, the sun gear Sa (the first element) of the first planetary gear set PGS1 is connected to the sun gear Sb (the fourth element) of the second planetary gear set PGS2 and, thus, a third connected member Sa-Sb is formed. Furthermore, the ring gear Rb (the sixth element) of the second planetary gear set PGS2 is connected to the sun gear Sc (the ninth element) of the third planetary gear set PGS3 and, thus, a fourth connected member Rb-Sc is formed.

The third connected member Sa-Sb is coupled to the input shaft 2. In addition, the ring gear Rd (the tenth element) of the fourth planetary gear set PGS4 is coupled to the output member 3 serving as an output gear.

In addition, according to the second exemplary embodiment, the automatic transmission includes first to third clutches C1 to C3 and first to third brakes B1 to B3 as an engagement mechanism.

The first clutch C1 is a wet multiple disc clutch. The first clutch C1 is configured to be switchable between a connection mode in which the third connected member Sa-Sb is connected to the carrier Cc (the eighth element) of the third planetary gear set PGS3 and a release mode in which the third connected member Sa-Sb is disconnected from the carrier Cc.

The second clutch C2 serves as a meshing mechanism formed from a dog clutch or a synchromesh mechanism having a synchronization capability. The second clutch C2 is configured to be switchable between a connection mode in which the carrier Cb (the fifth element) of the second planetary gear set PGS2 is connected to the carrier Cc (the eighth element) of the third planetary gear set PGS3 and a release mode in which the carrier Cb is disconnected from the carrier Cc. Note that the second clutch C2 may be formed as a wet multiple disc clutch.

The third clutch C3 is a wet multiple disc clutch. The third clutch C3 is configured to be switchable between a connection mode in which the first connected member Ca-Sd is connected to the fourth connected member Rb-Sc and a release mode in which the first connected member Ca-Sd is disconnected from the fourth connected member Rb-Sc.

The first brake B1 is a wet multiple disc brake. The first brake B1 is configured to be switchable between a fixed mode in which the first connected member Ca-Sd is fixed to the transmission case 1 and a release mode in which the first connected member Ca-Sd is unfixed from the transmission case 1.

The second brake B2 serves as a meshing mechanism formed from a dog clutch or a synchromesh mechanism having a synchronization capability. The second brake B2 is configured to be switchable between a fixed mode in which the carrier Cc (the eighth element) of the third planetary gear set PGS3 is fixed to the transmission case 1 and a release mode in which the carrier Cc is unfixed from the transmission case 1.

In addition, according to the second exemplary embodiment, the automatic transmission includes a one-way clutch F1 that is disposed parallel to the second brake B2. The one-way clutch F1 allows the normal rotation of the carrier Cc (the eighth element) of the third planetary gear set PGS3 and inhibits the reverse rotation of the carrier Cc.

The third brake B3 is a wet multiple disc brake. The third brake B3 is configured to be switchable between a fixed mode in which the ring gear Ra (the third element) of the first planetary gear set PGS1 is fixed to the transmission case 1 and a release mode in which the ring gear Ra is unfixed from the transmission case 1.

The modes of the clutches C1 to C3 and the brakes B1 to B3 are switched by a transmission control unit (TCU) (not shown) on the basis of vehicle information, such as a traveling speed of the vehicle.

The third planetary gear set PGS3 is disposed outside of the second planetary gear set PGS2 in the radial direction. In addition, the ring gear Rb (the sixth element) of the second planetary gear set PGS2 and the sun gear Sc (the ninth element) of the third planetary gear set PGS3 are integrated into one body to form the fourth connected member Rb-Sc. In this way, by disposing the third planetary gear set PGS3 outside of the second planetary gear set PGS2 in the radial direction, the second planetary gear set PGS2 overlaps the third planetary gear set PGS3 in the radial direction. Accordingly, the length of the automatic transmission in the axis direction can be decreased.

Note that the second planetary gear set PGS2 can at least partially overlap the third planetary gear set PGS3 in the radial direction. Thus, the length of the automatic transmission in the axis direction can be decreased. However, if the second planetary gear set PGS2 completely overlaps the third planetary gear set PGS3 in the radial direction, the length of the automatic transmission in the axis direction can be minimized.

The output member 3 formed from an output gear is disposed between the first planetary gear set PGS1 and the fourth planetary gear set PGS4. The transmission case 1 includes a side wall 1a between the output member 3 and the first planetary gear set PGS1. The side wall 1a inwardly extends in the radial direction. The side wall 1a includes a cylindrical portion 1b that extends inwardly in the radial direction of the output member 3. The output member 3 is rotatably supported by the cylindrical portion 1b via a bearing. Such a configuration allows the cylindrical portion 1b that is connected to the transmission case 1 and that has a high mechanical strength to firmly support the output member 3 in a rotatable manner.

The cases in which the gear ratios of the automatic transmission according to the second exemplary embodiment are established are described next with reference to FIG. 5 and FIGS. 6A to 6D.

In order to establish a first gear ratio, the clutch C2 is set in a connection mode, and the third brake B3 is set in a fixed mode. By setting the third brake B3 in the fixed mode, the rotational speed of the ring gear Ra (the third element) of the first planetary gear set PGS1 is set to "0". In addition, due to the operation performed by the one-way clutch F1, the rotational speed of the carrier Cc (the eighth element) of the third planetary gear set PGS3 is set to "0". In addition, by setting the second clutch C2 in the connection mode, the rotational speed of the carrier Cb (the fifth element) of the second planetary gear set PGS2 is set to "0", which is the same as the rotational speed of the carrier Cc (the eighth element) of the third planetary gear set PGS3. Thus, the rotational speed of the ring gear Rd (the tenth element) of the fourth planetary gear set PGS4 connected to the output member 3 is set to "1st" shown in FIG. 5. In this way, the first gear ratio is established.

Note that in the first gear ratio, the second brake B2 is in a release mode. Accordingly, the number of releases of the engagement mechanism is "4". However, since the second brake B2 is formed as a meshing mechanism, the friction loss can be prevented even in the release mode, as compared with the wet multiple disc brake. In addition, the rotational speed of the carrier Cc (the eighth element) of the third planetary gear set PGS3 is set to "0" due to the operation performed by the one-way clutch F1. Accordingly, even when the second brake B2 is formed from the wet multiple disc brake, friction loss does not occur in the second brake B2. Therefore, in the first gear ratio, the actual number of releases is "3".

Furthermore, in the first gear ratio, by additionally setting the second brake B2 in a fixed mode, engine brake can be activated.

In order to establish a second gear ratio, the second clutch C2 is set in a connection mode, and the first brake B1 is set in a fixed mode. By setting the first brake B1 in the fixed mode, the rotational speed of the first connected member Ca-Sd is set to "0". In addition, the rotational speed of the carrier Cc (the eighth element) of the third planetary gear set PGS3 is set to "0" due to the operation performed by the one-way clutch F1.

In addition, by setting the second clutch C2 in the connection mode, the rotational speed of the carrier Cb (the fifth element) of the second planetary gear set PGS2 is set to "0", which is the same as the rotational speed of the carrier Cc (the eighth element) of the third planetary gear set PGS3. Furthermore, the rotational speed of the ring gear Rd (the tenth element) of the fourth planetary gear set PGS4 connected to the output member 3 is set to "2nd" shown in FIG. 5. In this way, the second gear ratio is established.

Note that in the second gear ratio, the second brake B2 is in a release mode. Accordingly, the number of releases of the engagement mechanism is "4". However, as in the first gear ratio, friction loss does not occur in the second brake B2. Therefore, in the second gear ratio, the actual number of releases is "3".

Furthermore, even in the second gear ratio, by setting the second brake B2 in a fixed mode, engine brake can be activated.

In order to establish a third gear ratio, the second clutch C2 and the third clutch C3 are set in a connection mode. By setting the third clutch C3 in the connection mode, the first connected member Ca-Sd is connected to the fourth connected member Rb-Sc and, thus, the first connected member Ca-Sd and the fourth connected member Rb-Sc rotate at the same speed. In addition, due to the operation performed by the one-way clutch F1, the rotational speed of the carrier Cc (the eighth element) of the third planetary gear set PGS3 is set to "0".

Furthermore, by setting the second clutch C2 in the connection mode, the rotational speed of the carrier Cb (the fifth element) of the second planetary gear set PGS2 is set to "0", which is the same as the rotational speed of the carrier Cc (the eighth element) of the third planetary gear set PGS3. Thus, the rotational speed of the ring gear Rd (the tenth element) of the fourth planetary gear set PGS4 connected to the output member 3 is set to "3rd" shown in FIG. 5. In this way, the third gear ratio is established.

Note that in the third gear ratio, the second brake B2 is in a release mode. Accordingly, the number of releases of the engagement mechanism is "4". However, as in the first and second gear ratios, friction loss does not occur in the second brake B2. Therefore, in the third gear ratio, the actual number of releases is "3".

Furthermore, even in the third gear ratio, by setting the second brake B2 in a fixed mode, engine brake can be activated.

In order to establish a fourth gear ratio, the second clutch C2 and the third clutch C3 are set in a connection mode. In addition, the first brake B1 is set in the fixed mode. By setting the second clutch C2 in the connection mode, the carrier Cb (the fifth element) of the second planetary gear set PGS2 and the carrier Cc (the eighth element) of the third planetary gear set PGS3 rotate at the same speed. In addition, by setting the first brake B1 in the fixed mode, the rotational speed of the first connected member Ca-Sd is set to "0".

Furthermore, by setting the third clutch C3 in the connection mode, the rotational speed of the fourth connected member Rb-Sc is set to "0", which is the same as the rotational speed of the first connected member Ca-Sd. Thus, the rotational speed of the ring gear Rd (the tenth element) of the fourth planetary gear set PGS4 connected to the output member 3 is set to "4th" shown in FIG. 5. In this way, the fourth gear ratio is established.

In order to establish a fifth gear ratio, the second clutch C2 and the third clutch C3 are set in a connection mode. In addition, the third brake B3 is set in the fixed mode. By setting the second clutch C2 in the connection mode, the carrier Cb (the fifth element) of the second planetary gear set PGS2 and the carrier Cc (the eighth element) of the third planetary gear set PGS3 rotate at the same speed. In addition, by setting the third clutch C3 in the connection mode, the fourth connected member Rb-Sc and the first connected member Ca-Sd rotate at the same speed.

Furthermore, by setting the third brake B3 in the fixed mode, the rotational speed of the ring gear Ra (the third element) of the first planetary gear set PGS1 is set to "0". Thus, the rotational speed of the ring gear Rd (the tenth element) of the fourth planetary gear set PGS4 connected to the output member 3 is set to "5th" shown in FIG. 5. In this way, the fifth gear ratio is established.

In order to establish a sixth gear ratio, the first to third clutches C1 to C3 are set in the connection mode. By setting the first clutch C1 and the second clutch C2 in the connection mode, the sun gear Sb (the fourth element) of the second planetary gear set PGS2 and the carrier Cb (the fifth element) rotate at the same speed "1". In addition, the fourth to sixth elements Sb, Cb, and Rb of the second planetary gear set PGS2 enter a lock mode in which relative rotation of the elements is not allowed. Thus, the fourth to sixth elements Sb, Cb, and Rb rotate at the speed "1". In addition, the rotational speeds of the carrier Cc (the eighth element) and the sun gear Sc (the ninth element) of the third planetary gear set PGS3 are set to "1". Thus, the seventh to ninth elements Rc, Cc, and Sc of the third planetary gear set PGS3 enter a lock mode in which relative rotation of the elements is not allowed. Therefore, the seventh to ninth elements Rc, Cc, and Sc rotate at the speed "1".

Furthermore, by setting the third clutch C3 in the connection mode, the first connected member Ca-Sd rotates at the rotational speed "1", which is the same as the rotational speed of the fourth connected member Rb-Sc. Still furthermore, the tenth to twelfth elements Rd, Cd, and Sd of the fourth planetary gear set PGS4 also enter a lock mode in which relative rotations of the elements is not allowed. Thus, the rotational speed of the ring gear Rd (the tenth element) of the fourth planetary gear set PGS4 connected to the output member 3 is set to "6th" shown in FIG. 5. In this way, the sixth gear ratio is established.

In order to establish a seventh gear ratio, the first clutch C1 and the second clutch C2 are set in the connection mode. In addition, the third brake B3 is set in the fixed mode. By setting the first clutch C1 and the second clutch C2 in the connection mode, the sun gear Sb (the fourth element) of the second planetary gear set PGS2 and the carrier Cb (the fifth element) of the second planetary gear set PGS2 rotate at the same speed "1". The fourth to sixth elements Sb, Cb, and Rb of the second planetary gear set PGS2 enter a lock mode in which relative rotation of the elements is not allowed. Thus, the fourth to sixth elements Sb, Cb, and Rb rotate at the speed "1". In addition, the rotational speeds of the carrier Cc (the eighth element) and the sun gear Sc (the ninth element) of the third planetary gear set PGS3 are also set to "1". Furthermore, the seventh to ninth elements Rc, Cc, and Sc of the third planetary gear set PGS3 enter a lock mode in which relative rotation of the elements is not allowed and rotate at the speed "1". Accordingly, the rotational speed of the second connected member Rc-Cd is set to "1".

Furthermore, by setting the third brake B3 in the fixed mode, the rotational speed of the ring gear Ra (the third element) of the first planetary gear set PGS1 is set to "0". Thus, the rotational speed of the ring gear Rd (the tenth element) of the fourth planetary gear set PGS4 connected to the output member 3 is set to "7th" shown in FIG. 5. In this way, the seventh gear ratio is established.

In order to establish an eighth gear ratio, the first clutch C1 and the third clutch C3 are set in the connection mode. In addition, the third brake B3 is set in the fixed mode. By setting the first clutch C1 in the connection mode, the rotational speed of the carrier Cc (the eighth element) of the third planetary gear set PGS3 is set to "1", which is the same as the rotational speed of the third connected member Sa-Sb. In addition, by setting the third clutch C3 in the connection mode, the first connected member Ca-Sd and the fourth connected member Rb-Sc rotate at the same speed.

Furthermore, by setting the third brake B3 in the fixed mode, the rotational speed of the ring gear Ra (the third element) of the first planetary gear set PGS1 is set to In addition, the rotational speed of the ring gear Rd (the tenth element) of the fourth planetary gear set PGS4 connected to the output member 3 is set to "8th" shown in FIG. 5. In this way, the eighth gear ratio is established.

In order to establish a ninth gear ratio, the first clutch C1 and the third clutch C3 are set in the connection mode. In addition, the first brake B1 is set in the fixed mode. By setting the first clutch C1 in the connection mode, the rotational speed of the carrier Cc (the eighth element) of the third planetary gear set PGS3 is set to "1", which is the same as the rotational speed of the third connected member Sa-Sb. In addition, by setting the first brake B1 in the fixed mode, the rotational speed of the first connected member Ca-Sd is set to "0".

In addition, by setting the third clutch C3 in the connection mode, the rotational speed of the fourth connected member Rb-Sc is set to "0", which is the same as the rotational speed of the first connected member Ca-Sd. The rotational speed of the ring gear Rd (the tenth element) of the fourth planetary gear set PGS4 connected to the output member 3 is set to "9th" shown in FIG. 5. In this way, the ninth gear ratio is established.

In order to establish a reverse gear, the third clutch C3 is set in the connection mode, and the second brake B2 and the third brake B3 are set in the fixed mode. By setting the second brake B2 in the fixed mode, the rotational speed of the carrier Cc (the eighth element) of the third planetary gear set PGS3 is set to "0". In addition, by setting the third brake B3 in the fixed mode, the rotational speed of the ring gear Ra (the third element) of the first planetary gear set PGS1 is set to "0".

Furthermore, by setting the third clutch C3 in the connection mode, the first connected member Ca-Sd and the fourth connected member Rb-Sc rotate at the same speed. Still furthermore, the rotational speed of the ring gear Rd (the tenth element) of the fourth planetary gear set PGS4 connected to the output member 3 is set to "Rvs" representing the reverse rotation (rotation in a direction in which vehicle moves backward) shown in FIG. 5. In this way, the reverse gear is established.

Note that the speed line indicated by a dotted line in FIG. 5 indicates that among the first to fourth planetary gear set PGS1 to PGS4, elements of the planetary gear sets other than the planetary gear set that transfers drive power rotate (rotate freely) while following the planetary gear set that transfers drive power.

FIG. 6A illustrates all the modes of the clutches C1 to C3, the brakes B1 to B3, and the one-way clutch F1 in the above-described gear ratios. The symbol "O" in the columns of the clutches C1 to C3 and brakes B1 to B3 indicates the connection mode or the fixed mode. The empty cells indicate the release mode. In addition, the symbol "O" in the column of the one-way clutch F1 indicates that the rotational speed of the carrier Cc (the eighth element) of the third planetary gear set PGS3 is set to "0" due to the operation performed by the one-way clutch F1.

FIG. 6B illustrates the gear ratios (the rotational speed of the input shaft 2/the rotational speed of the output member 3) in the first to ninth gear ratios when the gear ratio h of the first planetary gear set PGS1 is set to 2.348, the gear ratio i of the second planetary gear set PGS2 is set to 2.356, the gear ratio j of the third planetary gear set PGS3 is set to 1.842, and the gear ratio k of the fourth planetary gear set PGS4 is set to 3.308, as shown in FIG. 6D. As can be seen from FIG. 6B, the common ratio (the ratio of one of the gear ratios to the next gear ratio) has an appropriate value, as shown in FIG. 6C. In addition, the ratio range (the first gear ratio/the ninth gear ratio) shown in FIG. 6D has an appropriate value.

According to the second exemplary embodiment, the automatic transmission can provide nine forward gear ratios. In addition, in each of the gear ratios, the number of releases of the wet multiple disc clutch and the wet multiple disc brake is less than or equal to 3. Thus, friction loss can be reduced and, therefore, the transmission efficiency of the driving force can be increased.

In addition, let the gear ratios be defined as follows: the seventh gear ratio is defined as a predetermined middle gear ratio, the first gear ratio to the seventh gear ratio, which is the predetermined middle gear ratio, are defined as a low speed gear range, and the eighth gear ratio to the ninth gear ratio that are higher than the seventh gear ratio, which is the predetermined middle gear ratio, are defined as a high speed gear range. Then, in the high speed gear range from the eighth gear ratio to the ninth gear ratio that are higher than the seventh gear ratio, which is the predetermined middle gear ratio, the second clutch C2 formed from a meshing mechanism having friction loss lower than that of the wet multiple disc clutch is in a release mode.

In addition, the second brake B2 that is in the release mode for all of the gear ratios other than the reverse gear is formed from a meshing mechanism. Accordingly, in the high speed gear range, the number of releases of the wet multiple disc clutch and the wet multiple disc brake is set to 1. Thus, friction loss can be reduced when the vehicle travels in a high speed gear range and, therefore, fuel consumption can be reduced.

Furthermore, in the range from the seventh gear ratio, which is the predetermined middle gear ratio, to the eighth gear ratio, the second clutch C2 formed from a meshing mechanism is switched only between the connection mode and the release mode. The transmission torque (the transmission driving force) of the second clutch C2 at the seventh gear ratio (at the predetermined middle gear ratio) is relatively small. Accordingly, even when the second clutch C2 is formed from a dog clutch serving as a meshing mechanism, switch between the connection mode and the release mode can be smoothly performed when the seventh gear ratio is shifted to the eighth gear ratio and vice versa.

Still furthermore, all of the planetary gear sets PGS1 to PGS4 are formed from single pinion planetary gear sets. Accordingly, the number of meshes between the gears in the transmission path of the driving force can be reduced, as compared with a double-pinion planetary gear set including a sun gear, a ring gear, and a carrier that supports a pair of pinions which are meshed with each other, one of which is meshed with the sun gear and the other is meshed with the ring gear so that the pinions are rotatable about their axes and are revolvable around the sun gear (when the carrier is fixed, the sun gear and the ring gear rotate in the same directions. Thus, a double-pinion planetary gear set is referred to as a "plus planetary gear set" or a "positive planetary gear set". Note that if the ring gear is fixed, the sun gear and the carrier rotate in opposite directions.) Therefore, the transmission efficiency can be increased.

Yet still furthermore, since the one-way clutch F1 is formed together with the second brake B2, the need for changing the mode of the second brake B2 when third gear is shifted to fourth gear and vice versa can be eliminated. Thus, the transmission controllability can be improved.

Note that while the second exemplary embodiment has been described with reference to the second clutch C2 and the second brake B2 formed from a meshing mechanism, the second clutch C2 and the second brake B2 may be formed from the wet multiple disc clutch and the wet multiple disc brake. Even in such a case, the advantage of the embodiment of the present invention can be provided. That is, the number of releases of the wet multiple disc clutch and the number of releases in each of the gear ratios can be less than or equal to three. Thus, friction loss can be reduced.

In addition, the one-way clutch F1 may be removed. In such a case, the second brake B2 can be in the fixed mode when the first to third gear ratios are established. Furthermore, if the one-way clutch F1 is removed, the second brake B2 may be formed from a two-way clutch that can switch between the fixed mode in which the carrier Cc (the eighth element) of the third planetary gear set PGS3 is fixed to the transmission case 1 and a reverse rotation prevention mode in which the normal rotation of the carrier Cc (the eighth element) of the third planetary gear set PGS3 is allowed and the reverse rotation of the carrier Cc is inhibited. In such a case, for example, as in the first exemplary embodiment illustrated in FIGS. 7A to 7C, a two-way clutch can be configured. Thereafter, the two-way clutch can operate in each of the gear ratios in the same manner as in the first exemplary embodiment.

While the second exemplary embodiment has been described with reference to a 9-forward-speed transmission, a 6-forward-speed transmission without, for example, second, fourth, and ninth gear ratios can be employed.

According to an embodiment of the present invention, an automatic transmission includes an input shaft rotatably supported inside a transmission case and rotated by a driving force received from a drive source, where rotation of the input shaft is changed into rotation at a plurality of rotational speeds through a plurality of gear ratios and output from an output member, first to fourth planetary gear sets each including three elements representing a sun gear, a carrier, and a ring gear, and six engagement mechanisms representing a first clutch, a second clutch, a third clutch, a first brake, a second brake, and a third brake. The elements of the second and third planetary gear sets form four rotary elements defined as a first rotary element, a second rotary element, third rotary element, and the fourth rotary element in a collinear diagram capable of representing relative rotational speed ratios of the four rotary elements in the form of straight lines. The first rotary element, the second rotary element, the third rotary element, and the fourth rotary element are arranged in the collinear diagram in sequence from one side of the collinear diagram. The three elements of the first planetary gear set are defined as a first element, a second element, and a third element in a collinear diagram capable of representing relative rotational speed ratios of the three elements in the form of straight lines. The first element, the second element, and the third element are arranged in sequence from one side of the collinear diagram at intervals corresponding to gear ratios thereof. The three elements of the fourth planetary gear set are defined as a fourth element, a fifth element, and a sixth element in a collinear diagram capable of representing relative rotational speed ratios of the three elements in the form of straight lines. The fourth element, the fifth element, and the sixth element are arranged in sequence from one side of the collinear diagram at intervals corresponding to gear ratios thereof. The first element is connected to the input shaft, the fourth element is connected to the output member, the second element is connected to the sixth element to form a first connected member, and the second rotary element is connected to the fifth element to form a second connected member. The first clutch releasably connects the first element to the third rotary element, the second clutch releasably connects the first element to the first rotary element, the third clutch releasably connects the first connected member to the fourth rotary element, the first brake releasably fixes the first connected member to the transmission case, the second brake releasably fixes the third rotary element to the transmission case, and the third brake releasably fixes the third element to the transmission case. The plurality of gear ratios are established by setting at least three of the six engagement mechanisms in one of a connection mode and a fixed mode.

In such a configuration, as is apparent from the exemplary embodiment described below, three of the six engagement mechanisms, namely, the three clutches and three brakes, are engaged in each of the gear ratios and enter the connection mode or the fixed mode. Accordingly, the number of released engagement mechanisms (i.e., the number of the engagement mechanisms that are not in the connection mode or the fixed mode) in each of the gear ratios is three. Therefore, as compared with existing automatic transmissions in which four engagement mechanisms are released in each of the gear ratios, the friction loss caused by the released engagement mechanisms can be reduced and, thus, the transmission efficiency of the automatic transmission can be increased.

According to another embodiment of the present invention, an automatic transmission includes an input shaft rotatably supported inside a transmission case and rotated by a driving force received from a drive source, where rotation of the input shaft is changed into rotation at a plurality of rotational speeds through a plurality of gear ratios and output from an output member, first to fourth planetary gear sets each including three elements representing a sun gear, a carrier, and a ring gear, and six engagement mechanisms representing a first clutch, a second clutch, a third clutch, a first brake, a second brake, and a third brake. The three elements of the first planetary gear set are defined as a first element, a second element, and a third element in a collinear diagram capable of representing relative rotational speed ratios of the three elements in the form of straight lines. The first element, the second element, and the third element are arranged in sequence from one side of the collinear diagram at intervals corresponding to gear ratios thereof. The three elements of the second planetary gear set being defined as a fourth element, a fifth element, and a sixth element in a collinear diagram capable of representing relative rotational speed ratios of the three elements in the form of straight lines. The fourth element, a fifth element, and a sixth element are arranged in sequence from one side of the collinear diagram at intervals corresponding to gear ratios thereof. The three elements of the third planetary gear set are defined as a seventh element, an eighth element, and a ninth element in a collinear diagram capable of representing relative rotational speed ratios of the three elements in the form of straight lines. The seventh element, the eighth element, and the ninth element are arranged in sequence from one side of the collinear diagram at intervals corresponding to gear ratios thereof. The three elements of the fourth planetary gear set are defined as a tenth element, an eleventh element, and a twelfth element in a collinear diagram capable of representing relative rotational speed ratios of the three elements in the form of straight lines. The tenth element, the eleventh element, and the twelfth element are arranged in sequence from one side of the collinear diagram at intervals corresponding to gear ratios thereof. The second element is connected to the twelfth element to form a first connected member, the seventh element is connected to the eleventh element to form a second connected member, the first element is connected to the fourth element to form a third connected member, the sixth element is connected to the ninth element to form a fourth connected member, the third connected member is connected to the input shaft, and the tenth element is connected to the output member. The first clutch releasably connects the eighth element to the third connected member, the second clutch releasably connects the fifth element to the eighth element, the third clutch releasably connects the first connected member to the fourth connected member, the first brake releasably fixes the first connected member to the transmission case, the second brake releasably fixes the eighth element to the transmission case, and the third brake releasably fixes the third element to the transmission case. The plurality of gear ratios are established by setting at least three of the six engagement mechanisms in one of a connection mode and a fixed mode.

Like the above-described embodiment, in such a configuration, as is apparent from the exemplary embodiment described below, the number of released engagement mechanisms (i.e., the number of the engagement mechanisms that are not in the connection mode or the fixed mode) among the six engagement mechanisms, namely, the three clutches and three brakes, is three in each of the gear ratios. Therefore, the friction loss caused by the released engagement mechanisms can be reduced and, thus, the transmission efficiency of the automatic transmission can be increased.

The third planetary gear set can be disposed outside of the second planetary gear set in a radial direction of the second planetary gear set, and one of the first to fourth rotary elements and the fourth connected member can be formed by integrating the sun gear of the third planetary gear set into the ring gear of the second planetary gear set.

In such a configuration, since the third planetary gear set is disposed outside of the second planetary gear set in a radial direction of the second planetary gear set, the length of the automatic transmission in the axis direction can be reduced.

The second clutch can be formed from a meshing mechanism. A meshing mechanism, such as a dog clutch or a synchromesh gearbox, can reduce friction loss even in a release mode in which the connection is released, as compared with a wet multiple disc clutch that uses friction engagement. Accordingly, in such a configuration, the friction loss can be further reduced.

The second brake can be formed from a meshing mechanism. In such a configuration, the friction loss of the second brake can be reduced and, therefore, the friction loss of the automatic transmission can be reduced.

The automatic transmission can further include a one-way clutch configured to allow a normal rotation of one of the third rotary element and the eighth element and inhibit a reverse rotation of one of the third rotary element and the eighth element. In such a configuration, as can be seen from the exemplary embodiments described below, the fastening power required for the second brake can be reduced. Thus, even when the second brake is formed from a wet multiple disc brake, the friction loss of the second brake can be reduced. In addition, the gear change controllability of the automatic transmission can be improved.

Without using the above-described one-way clutch, the second brake can be formed from a two-way clutch that is switchable between a fixed mode in which one of the third rotary element and the eighth element is fixed to the transmission case and a reverse rotation prevention mode in which normal rotation of one of the third rotary element and the eighth element is allowed and reverse rotation of one of the third rotary element and the eighth element is inhibited. In this configuration, the friction loss can be also reduced.

Each of the first to forth planetary gear sets can be formed from a single-pinion planetary gear set including a sun gear, a ring gear, and a carrier that rotatably support a pinion meshed with the sun gear and the ring gear so that the pinion is rotatable about an axis thereof and is revolvable around the sun gear (a single-pinion planetary gear set is also referred to as a "minus planetary gear set" or a "negative planetary gear set". Note that if the ring gear is fixed, the sun gear and the carrier rotate in the same direction.)

In existing automatic transmissions, the planetary gear set is formed from a sun gear, a ring gear, and a carrier that supports a pair of first pinions meshed with each other, one of which is meshed with the first sun gear and the other is meshed with the first ring gear. The first pinions rotate about their axes and revolves around the sun gear. That is, the planetary gear set is formed from a so-called double-pinion planetary gear set (if the carrier is fixed, the sun gear and the ring gear rotate in the same direction. Accordingly, the planetary gear set is referred to as a "plus planetary gear set" or a "positive planetary gear set". Note that if the ring gear is fixed, the sun gear and the carrier rotate in opposite directions.) In the configuration described above, as compared with existing automatic transmissions, the number of locations at which the gears are meshed with each other in a transmission path of the power between the input shaft and the output member can be reduced. Accordingly, the transmission efficiency can be increased.

The automatic transmission can further include a start clutch capable of transferring the driving force of the drive source to the input shaft.

The driving force of the drive source can be transferred to the input shaft via a torque converter.

Obviously, numerous modifications and variations of the present invention are possible in light of the above teachings. It is therefore to be understood that within the scope of the appended claims, the invention may be practiced otherwise than as specifically described herein.

What is claimed is:
1. An automatic transmission comprising:
an input shaft rotatably arranged relative to a transmission case and configured to be rotated with a driving force of a drive source relative to the transmission case, rotation of the input shaft being changed into rotation at a plurality of rotational speeds through a plurality of gear ratios;

an output member to output rotation of the input shaft;
a first planetary gear set including a first sun gear, a first carrier, and a first ring gear;
a second planetary gear set including a second sun gear, a second carrier, and a second ring gear;
a third planetary gear set including a third sun gear, a third carrier, and a third ring gear;
a fourth planetary gear set including a fourth sun gear, a fourth carrier, and a fourth ring gear;
an engagement mechanism;
the first sun gear being connected to the input shaft to rotate together with the input shaft;
the fourth ring gear being connected to the output member to rotate together with the output member;
the first carrier being connected to the fourth sun gear to rotate together with the fourth sun gear, the first carrier and the fourth sun gear being defined as a first connected member;
the third ring gear being connected to the fourth carrier to rotate together with the fourth carrier, the third ring gear and the fourth carrier being defined as a second connected member;
the engagement mechanism comprising:
  a first clutch configured to connect and disconnect the first sun gear to and from the second carrier and the third carrier;
  a second clutch configured to connect and disconnect the first sun gear to and from the second sun gear;
  a third clutch configured to connect and disconnect the first connected member to and from the second ring gear and the third sun gear;
  a first brake configured to connect and disconnect the first connected member to and from the transmission case;
  a second brake configured to connect and disconnect the second carrier and the third carrier to and from the transmission case; and
  a third brake configured to connect and disconnect the first ring gear to and from the transmission case; and
each of the plurality of gear ratios being provided by setting at least three of the first to third clutches and the first to third brakes in a connection state.

2. The automatic transmission according to claim 1, wherein
the third planetary gear set is disposed outside of the second planetary gear set in a radial direction of the second planetary gear set, and
a fourth connected member is provided by integrating the third sun gear of the third planetary gear set with the second ring gear of the second planetary gear set.

3. The automatic transmission according to claim 1, wherein the second clutch comprises a meshing mechanism.

4. The automatic transmission according to claim 1, wherein the second brake comprises a meshing mechanism.

5. The automatic transmission according to claim 1, further comprising:
a one-way clutch configured to allow the second carrier and the third carrier to rotate only in a forward rotation direction relative to the transmission case.

6. The automatic transmission according to claim 1, wherein
the second brake comprises a two-way clutch configured to switch the second brake between a fixed state and a reverse rotation prevention state,
in the fixed state, the second carrier and the third carrier are connected to the transmission case, and in the reverse rotation prevention state, the two-way clutch allows the second carrier and the third carrier to rotate only in a forward rotation direction relative to the transmission case.

7. The automatic transmission according to claim 1, wherein
each of the first to fourth planetary gear sets comprises a single-pinion planetary gear set,
the first planetary gear set further includes a first pinion gear supported by the first carrier and meshed with the first sun gear and the first ring gear in a freely orbitable and rotatable manner,
the second planetary gear set further includes a second pinion gear supported by the second carrier and meshed with the second sun gear and the second ring gear in a freely orbitable and rotatable manner,
the third planetary gear set further includes a third pinion gear supported by the third carrier and meshed with the third sun gear and the third ring gear in a freely orbitable and rotatable manner, and
the fourth planetary gear set further includes a fourth pinion gear supported by the fourth carrier and meshed with the fourth sun gear and the fourth ring gear in a freely orbitable and rotatable manner 8. The automatic transmission according to claim 1, further comprising:
a start clutch configured to transmit the driving force of the drive source to the input shaft.

9. The automatic transmission according to claim 1, wherein the driving force of the drive source is transmitted to the input shaft via a torque converter.

10. An automatic transmission comprising:
an input shaft rotatably arranged relative to a transmission case and configured to be rotated with a driving force of a drive source, rotation of the input shaft being changed into rotation at a plurality of rotational speeds through a plurality of gear ratios;
an output member to output rotation of the input shaft;
a first planetary gear set including a first sun gear, a first carrier, and a first ring gear;
a second planetary gear set including a second sun gear, a second carrier, and a second ring gear;
a third planetary gear set including a third sun gear, a third carrier, and a third ring gear;
a fourth planetary gear set including a fourth sun gear, a fourth carrier, and a fourth ring gear;
an engagement mechanism;
the first carrier being connected to the fourth sun gear to rotate together with the fourth sun gear, the first carrier and fourth sun gear being defined as a first connected member;
the third ring gear being connected to the fourth carrier to rotate together with the fourth carrier, the third ring gear and fourth carrier being defined as a second connected member;
the first sun gear being connected to the second sun gear to rotate together with the second sun gear, the first sun gear and second sun gear being defined as a third connected member;
the second ring gear being connected to the third sun gear to rotate together with the third sun gear, the second ring gear and third sun gear being defined as a fourth connected member;
the third connected member being connected to the input shaft to rotate together with the input shaft;
the fourth ring gear being connected to the output member to rotate together with the output member;

the engagement mechanism comprising:
- a first clutch configured to connect and disconnect the third carrier to and from the third connected member;
- a second clutch configured to connect and disconnect the second carrier to and from the third carrier;
- a third clutch configured to connect and disconnect the first connected member to and from the fourth connected member;
- a first brake configured to connect and disconnect the first connected member to and from the transmission case;
- a second brake configured to connect and disconnect the third carrier to and from the transmission case; and
- a third brake configured to connect and disconnect the first ring gear to and from the transmission case; and each of the plurality of gear ratios being provided by setting at least three of the first to third clutches and the first to third brakes in a connection state.

11. The automatic transmission according to claim 10, wherein
the third planetary gear set is disposed outside of the second planetary gear set in a radial direction of the second planetary gear set, and
the fourth connected member is provided by integrating the third sun gear of the third planetary gear set into the second ring gear of the second planetary gear set.

12. The automatic transmission according to claim 10, wherein the second clutch comprises a meshing mechanism.

13. The automatic transmission according to claim 10, wherein the second brake comprises a meshing mechanism.

14. The automatic transmission according to claim 10, further comprising:
a one-way clutch configured to allow the third carrier to rotate only in a forward rotation direction relative to the transmission case.

15. The automatic transmission according to claim 10, wherein
the second brake comprises a two-way clutch configured to switch the second brake between a fixed state and a reverse rotation prevention state,
in the fixed state, the third carrier is connected to the transmission case, and
in the reverse rotation prevention state, the two-way clutch allows the third carrier to rotate only in a forward rotation direction relative to the transmission case.

16. The automatic transmission according to claim 10, wherein
each of the first to fourth planetary gear sets comprises a single-pinion planetary gear set,
the first planetary gear set further includes a first pinion gear supported by the first carrier and meshed with the first sun gear and the first ring gear in a freely orbitable and rotatable manner,
the second planetary gear set further includes a second pinion gear supported by the second carrier and meshed with the second sun gear and the second ring gear in a freely orbitable and rotatable manner,
the third planetary gear set further includes a third pinion gear supported by the third carrier and meshed with the third sun gear and the third ring gear in a freely orbitable and rotatable manner, and
the fourth planetary gear set further includes a fourth pinion gear supported by the fourth carrier and meshed with the fourth sun gear and the fourth ring gear in a freely orbitable and rotatable manner 17. The automatic transmission according to claim 10, further comprising:
a start clutch configured to transmit the driving force of the drive source to the input shaft.

18. The automatic transmission according to claim 10, wherein the driving force of the drive source is transmitted to the input shaft via a torque converter.

* * * * *